(12) United States Patent
Huang et al.

(10) Patent No.: US 12,244,378 B2
(45) Date of Patent: Mar. 4, 2025

(54) METHODS, BASEBAND UNIT SYSTEM AND RADIO UNIT OF A DISTRIBUTED BASE STATION HAVING CASCADE-COUPLED RADIO UNITS

(71) Applicant: Telefonaktiebolaget LM Ericsson (publ), Stockholm (SE)

(72) Inventors: Yezi Huang, Täby (SE); Chenguang Lu, Sollentuna (SE); Miguel Berg, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/277,638

(22) PCT Filed: Apr. 1, 2021

(86) PCT No.: PCT/SE2021/050302
§ 371 (c)(1),
(2) Date: Aug. 17, 2023

(87) PCT Pub. No.: WO2022/211690
PCT Pub. Date: Oct. 6, 2022

(65) Prior Publication Data
US 2024/0187061 A1    Jun. 6, 2024

(51) Int. Cl.
*H04B 7/06*    (2006.01)
*H04B 7/024*    (2017.01)
*H04B 7/0452*    (2017.01)

(52) U.S. Cl.
CPC .......... *H04B 7/0617* (2013.01); *H04B 7/024* (2013.01); *H04B 7/0452* (2013.01)

(58) Field of Classification Search
CPC ..... H04B 7/0617; H04B 7/024; H04B 7/0452
(Continued)

(56) References Cited

U.S. PATENT DOCUMENTS

2015/0124688 A1   5/2015   Xu et al.
2018/0287655 A1   10/2018   Sohn et al.
(Continued)

FOREIGN PATENT DOCUMENTS

WO   2018091089 A1   5/2018
WO   2018231107 A1   12/2018
(Continued)

OTHER PUBLICATIONS

Hu, et al., "Joint Beamformer Design for Wireless Fronthaul and Access Links in C-RANs," IEEE Transactions on Wireless Communications, vol. 17, Issue 5, May 2018, pp. 2869-2881.
(Continued)

*Primary Examiner* — Kevin M Burd
(74) *Attorney, Agent, or Firm* — Withrow & Terranova, PLLC

(57) ABSTRACT

Disclosed is a method performed by a first radio unit, RU, of a distributed base station system. The distributed base station system further comprises a Baseband Unit, BBU, connected to the first RU over a fronthaul link and a second RU connected to the first RU over an RU link. The first RU determines first part of beamforming weights that it uses for performing a first part of the beamforming of uplink signals received at its antennas into intermediate signals. The first RU further determines intermediate beamforming weights to be used for a second part of beamforming at the BBU. The first RU further receives, from the second RU, intermediate signals and intermediate beamforming weights determined by the second RU. The first RU combines the intermediate signals and sends them to the BBU. The first RU further combines the intermediate beamforming weights and sends them to the BBU.

20 Claims, 7 Drawing Sheets

(58) Field of Classification Search
USPC .......................................................... 375/262
See application file for complete search history.

(56) References Cited

U.S. PATENT DOCUMENTS

2019/0268804 A1* 8/2019 Estella Aguerri .... H04B 7/0456
2020/0036414 A1 1/2020 Shattil

FOREIGN PATENT DOCUMENTS

| WO | 2020130895 A1 | 6/2020 |
| WO | 2020226538 A1 | 11/2020 |
| WO | 2020242352 A1 | 12/2020 |
| WO | 2020256609 A1 | 12/2020 |

OTHER PUBLICATIONS

Hu, et al., "Joint Fronthaul Multicast Beamforming and User-Centric Clustering in Downlink C-RANs," IEEE Transactions on Wireless Communications, vol. 16, Issue 8, Aug. 2017, pp. 5395-5409.

Huang, et al., "Fronthaul Functional Split of IRC-Based Beamforming for Massive MIMO Systems," 90th Vehicular Technology Conference, Sep. 22, 2019, IEEE, 5 pages.

Huang, et al., "Functional Split of Zero-Forcing Based Massive MIMO for Fronthaul Load Reduction," IEEE Access, vol. 6, 10 pages, 2017.

Iu, et al., "Optimized Uplink Transmission in Multi-Antenna C-RAN With Spatial Compression and Forward," IEEE Transactions on Signal Processing, vol. 63, Issue 19, Oct. 1, 2015, pp. 5083-5095.

Mohammadian, et al., "RF Impairments in Wireless Transceivers: Phase Noise, CFO, and IQ Imbalance—A Survey," EEE Access, vol. 9, Aug. 2, 2021, 74 pages.

International Search Report and Written Opinion for International Patent Application No. PCT/SE2021/050302, mailed Dec. 7, 2021, 10 pages.

Author Unknown, "O-RAN Fronthaul Working Group; Control, User and Synchronization Plane Specification," Technical Specification O-RAN.WG4.CUS.0, Version 05.00, Feb. 28, 2021, O-RAN Alliance e.V., 292 pages.

Extended European Search Report for European Patent Application No. 21935352.1, mailed Dec. 16, 2024, 8 pages.

* cited by examiner

METHODS, BASEBAND UNIT SYSTEM AND RADIO UNIT OF A DISTRIBUTED BASE STATION HAVING CASCADE-COUPLED RADIO UNITS

This application is a 35 U.S.C. § 371 national phase filing of International Application No. PCT/SE2021/050302, filed Apr. 1, 2021, the disclosure of which is incorporated herein by reference in its entirety.

TECHNICAL FIELD

The present disclosure relates generally to methods, baseband unit (BBU) system and radio unit (RU) of a distributed base station having cascade-coupled RUs. More specifically, the present disclosure relates to a first RU of a distributed base station system, wherein the distributed base station system further comprises a BBU connected to the first RU over a fronthaul link and a second RU connected to the first RU over an RU link. The present disclosure also relates to a BBU system associated with the distributed base station system. The present disclosure further relates to computer programs and carriers corresponding to the above methods, RUs and systems.

BACKGROUND

In a centralized radio access network (C-RAN), also called a distributed base station system, radio access network (RAN), processing is conducted by two separate units: a radio unit (RU), and a base band unit (BBU). The BBU is connected to the RU via a fronthaul link. The RU may also be called remote radio unit (RRU). The base band unit may also be called base unit (BU) or digital unit or distributed unit (DU). The RU is connected to one or more antennas through which the RU wirelessly communicates with at least one user equipment (UE). The BBU is in its turn connected to other base station systems or base stations, and to a core network of a wireless communication system. The BBU is centralized and there is normally more than one RU connected to each BBU. Traditionally, the BBU performs advanced radio coordination features such as joint detection, joint decoding, coordinated multi-point transmission (CoMP), to increase the spectrum efficiency and network capacity, as well as baseband processing, whereas the RUs perform radio frequency (RF) processing and transmission/reception of the RF processed signals.

Originally, the RU was designed to reduce the cable loss of the coax cables between an antenna tower top where the actual antennas are situated and the bottom of the antenna tower where the base station functionality is hosted. Therefore, before $5^{th}$ Generation of mobile communication (5G), i.e. at 4G, e.g. Long Term Evolution (LTE), the RU was rather simple and was mainly doing RF processing with limited baseband processing, if any.

When going from 4G to 5G, there was a need to increase the wireless communication capacity towards the UEs in order to be able to deliver requested data amounts per time period in 5G. One enabler of the mobile evolution towards 5G is massive Multiple Input Multiple Output (MIMO) in which each RU has a plurality of antennas. Massive MIMO exploits spatial multiplexing to improve spectrum efficiency by using antenna arrays at the RU, which antenna array is equipped with N antennas simultaneously serving K user-layers in the same time-frequency resource. The typical scenario is N>>K e.g., N is 64, 128 or 256 while K is 8 or 16. As shown, the number of antennas is quite large. Massive MIMO is often referred to as massive beamforming, which can form narrow beams and focus on different directions, mitigating against the increased path loss of higher frequency bands. It also benefits multi-user MIMO, which allows the transmissions from/to multiple UEs simultaneously over separate spatial channels resolved by the massive MIMO technologies, while keeping high capacity for each UE. Therefore, it can significantly increase the spectrum efficiency and cell capacity.

In 5G evolution and future $6^{th}$ Generation of mobile communication (6G), massive MIMO is expected to support even more antennas, given that the cost per transceiver chain would decrease over time. To address this trend, the MIMO processing is foreseen to be more distributed and scalable, where a larger MIMO system is processed by multiple RUs, each of which only processes a subset of antennas. With such a scalable design, the MIMO system can easily scale with respect to the number of antennas.

To support such massive MIMO solutions, the required fronthaul link capacity needs to increase in proportion to the increase of number of antennas, at least when using current PHY-RF split between functionality of the BBU and the RU. This will dramatically drive up the fronthaul link costs.

To reduce the required fronthaul (FH) capacity, functional splits within the physical layer (PHY) are discussed and proposed. Basically, some baseband PHY functions will be moved to the RU, which mainly performs RF-related operations in the Common Public Radio Interface (CPRI) based implementation.

Specifically, emerging lower-layer split (LLS) options have the beamforming function placed in the RU to reduce the number of FH streams from the number of antennas to the number of user layers. As the number of user layers is much fewer than the number of antennas in the massive MIMO, the required FH capacity and thereby the FH costs are significantly reduced. For example, if the system is N=64 antennas and K=8 user layers, there are only 8 FH streams going through the FH link. This can reduce the required FH capacity, which is also proportional to traffic load. However, moving the beamforming processing, especially the beamforming calculation, to the RU increases significantly the complexity of the RU. Further, the system is not scalable to support more antennas. It needs to replace the existing RU to support more antennas. It also limits the joint-MIMO-processing possibility for coordinating multiple RUs at different places.

In "Functional Split of Zero-Forcing Based Massive MIMO for Fronthaul Load Reduction," by Y. Huang, C. Lu, M. Berg and P. Odling, published in IEEE Access, vol. 6, pp. 6350-6359, 2018, an intra-PHY functional split scheme between the BBU and the RU regarding uplink is proposed. Instead of moving all MIMO/beamforming processing to the RU, the MIMO processing is decomposed to two parts. The first part requiring lower complexity is implemented in the RU, while the second part requiring higher complexity is implemented in the BBU. The proposed intra-PHY functional split takes advantage of a formation feature of a known Zero-forcing (ZF) method and separates the MIMO processing into a maximum ratio combining (MRC) part and an interference-cancellation part. The MRC processing only carries out Hermitian transpose of the estimated channel. This is computationally light and therefore the MRC processing is moved to the RU. The interference cancellation part contains matrix inversion, which is computationally heavy. This is instead carried out in the BBU. This scheme reduces the number of FH streams to the number of layers and achieves the same performance as an original ZF-based approach when it is implemented totally in RU. However, the proposed intra-PHY functional split using the ZF-based method does not consider inter-cell interference, i.e. interference from UEs connected to other base stations. Consequently, the performance degrades when strong inter-cell interferences are present.

WO2020/130895 of the present applicant describes a method for offloading some RU complexity to the BBU and in at least some embodiments to make a base station system scalable to support more antennas at the RUs, while keeping a moderate FH traffic load. Parts of this disclosure present a method in which the mathematical formulation of an Interference Rejection Combining (IRC) method is reformulated as a ZF (zero-forcing) method of an extended "channel" including interference aspects, and then the ZF process is decomposed into two parts. The first part performs MRC, which is much simpler than the full IRC and is therefore implemented in the RU. The second part takes remaining calculations, such as matrix inversion, with high complexity and is implemented in the BBU.

Hereby, the number of required FH streams can be reduced to the number of desired user layers plus the number of the interfering user layers of co-channel interfering UEs from other cells. This is theoretically sound as the number of the degrees of freedom are reserved to the BBU to mitigate both intra-cell and inter-cell interferences, i.e. the interferences between desired user layers in the same cell and the interferences from the interfering user layers from other cells.

The overall complexity of the base station system of WO2020/130895 scales linearly with the number of antennas, instead of cubic scaling. However, WO2020/130895 addresses only a point-to-point FH topology, where each RU has a dedicated FH link to the BBU, as shown in FIG. 1. In the point-to-point FH topology example of a distributed base station system 10 as shown in FIG. 1, a first RU 30 is connected to a BBU 20 over a first FH link 25, a second RU 40 is connected to the BBU 20 over a second FH link 35 and third RU 50 is connected to the BBU 20 over a third FH link 45. The first, second and third RUs 30, 40, 50 are arranged to transmit and receive user-plane data as antenna signals to/from UEs 31, 32, 33. Such a point-to-point FH would need many fiber connections and the same number of BBU ports, even if those RUs are configured as a joint larger MIMO system.

In this disclosure on the other hand, a cascaded topology of RUs is addressed, as shown in FIG. 2. In a cascaded topology, a first RU 120 is connected to the BBU 110 over a fronthaul link 140 as in the point-to-point topology. However, the second RU 160 is then connected to the first RU 120 via a separate RU-RU link 165, and a third RU 170 is connected to the second RU 160 via another separate RU-RU link 175. Further, if there are any more RUs, they are in their turn connected to an RU, one after the other as in a line. In FIG. 2, there are only three RUs illustrated but there may be many more RUs in such a cascade-coupled topology. The cascaded RU deployment would reduce the amount of FH fiber links and the number of BBU ports to 1. This would help reduce the deployment costs, i.e. fiber connections and system complexity, i.e. BBU ports.

However, in the cascade-coupled topology, especially when using the methods described in WO2020/130895, each RU will send a separate data flow including both fronthaul user-plane data and control plane data over the same cascaded RU-RU links and towards the BBU eventually via the FH link 140 between the BBU 110 and the first RU 120. This increases the FH bit rate at each RU-RU link. Especially, the FH link 140 between the BBU 110 and the first RU 120 aggregates all RU data, where the total traffic increases proportionally to the number of RUs. In this case, much more expensive optical transceivers are required to handle the increased FH traffic to reduce the number of fibers. Also, a port of the BBU connected to first RU 120 would need to process much more data which would increase the BBU complexity. Consequently, there is a need for a solution to handle distributed base station systems having RUs cascade-coupled to the BBU. Such a solution should preferably manage to keep the total amount of data of both FH user-plane and control plane sent over the FH link low, preferably on the same level of the individual FH link in the star topology, and also require minimum changes in the BBU processing.

SUMMARY

It is an object of the invention to address at least some of the problems and issues outlined above. It is possible to achieve these objects and others by using methods, network nodes and wireless devices as defined in the attached independent claims.

According to one aspect, a method is provided that is performed by a first RU of a distributed base station system, the first RU comprising N1 antennas. The distributed base station system further comprises a BBU connected to the first RU over a fronthaul link and a second RU connected to the first RU over an RU link, the second RU comprising N2 antennas. The method comprises obtaining first uplink signals $y_1$ in frequency domain as received at the N1 antennas from a number of UEs, the first uplink signals $y_1$ comprising K user-layer signals in frequency domain overlaid with interference signals and noise. The method further comprises obtaining a first channel estimate $\hat{H}_1$ of wireless communication channels $H_1$ in frequency domain between the number of UEs and the N1 antennas, and determining a first part of BFW) for the first RU based on the first channel estimate $\hat{H}_1$ and on reference signals received at the N1 antennas together with the first uplink signals, the first part of BFW being used to reduce the N1 first uplink signals to K+M first intermediate signals $\tilde{y}_1$, where K+M is lower than N1. The method further comprises determining the K+M first intermediate signals $\tilde{y}_1$ based on the N1 first uplink signals $y_1$ and on the first part of the BFW for the first RU, and determining a first part of intermediate BFW $C_1$ for interference cancellation at the BBU based on the first channel estimate $\hat{H}_1$ and on the reference signals received at the N1 antennas together with the first uplink signals. Further, the method comprises receiving, from the second RU, K+M second intermediate signals $\tilde{y}_2$, the second intermediate signals being determined by the second RU based on second uplink signals $y_2$ in frequency domain as received at the N2 antennas of the second RU from the number of UEs and on a first part of BFW for the second RU determined by the second RU based on a second channel estimate $\hat{H}_2$ of wireless communication channels $H_2$ in frequency domain between the number and the N2 antennas and on reference signals received at the N2 antennas together with the second uplink signals, the first part of BFW of the second RU being used to reduce the N2 second uplink signals to the K+M second intermediate signals $\tilde{y}_2$, where K+M is lower than N2. The method further comprises receiving, from the second RU, a second part of intermediate BFW $C_2$ for interference cancellation, determined by the second RU based on the second channel estimate $\hat{H}_2$ and on the refersecond uplink signals. The method further comprises combining the first intermediate signals $\tilde{y}_1$ and the second intermediate signals $\tilde{y}_2$ into combined intermediate signals $\tilde{y}_1+\tilde{y}_2$, combining the first part of intermediate BFW $C_1$ and the second part of intermediate BFW $C_2$ into combined intermediate BFW $C_1+C_2$, and sending, to the BBU over the fronthaul link, the combined intermediate signals $\tilde{y}_1+\tilde{y}_2$ and the combined intermediate BFW $C_1+C_2$.

According to another aspect, a method is provided that is performed by a BBU system of a wireless communication network. The wireless communication network comprises a distributed base station system having a BBU, a first RU connected to the BBU over a fronthaul link, and a second RU connected to the first RU over an RU link. The first RU comprises N1 antennas and the second RU comprises N2 antennas. The method comprises receiving, from the first RU, combined intermediate signals $\tilde{y}_1+\tilde{y}_2$ in frequency domain comprising first intermediate signals $\tilde{y}_1$ and second intermediate signals $\tilde{y}_2$. The first intermediate signals $\tilde{y}_1$ are determined by the first RU based on first uplink signals $y_1$ as received at the N1 antennas of the first RU from a number of UEs. The first uplink signals $y_1$ comprise K user-layer signals overlaid with interference signals and noise. The first intermediate signals are further determined based on a first part of BFW for the first RU, determined by the first RU based on a first channel estimate $\hat{H}_1$ of wireless communication channels $H_1$ in frequency domain between the number UEs and the N1 antennas, and on reference signals received at the N1 antennas together with the first uplink signals. The first part of BFW is used to reduce the N1 first uplink signals to K+M first intermediate signals $\tilde{y}_1$, where K+M is lower than N1. The second intermediate signals $\tilde{y}_2$ are determined by the second RU based on second uplink signals $y_2$ as received at the N2 antennas of the second RU from the number of UEs. The second uplink signals $y_2$ comprise K user-layer signals overlaid with interference signals and noise. The second intermediate signals are further determined based on first part of BFW for the second RU, determined by the second RU based on a second channel estimate $\hat{H}_2$ of wireless communication channels $H_2$ in frequency domain between the number of UEs and the N2 antennas, and on reference signals received at the N2 antennas together with the second uplink signals. The method further comprises receiving, from the first RU, combined intermediate BFW $C_1+C_2$ comprising a first part of intermediate BFW $C_1$ and a second part of intermediate BFW $C_2$. The first part of intermediate BFW $C_1$ is determined by the first RU based on the first channel estimate $\hat{H}_1$ and on the reference signals received at the N1 antennas together with the first uplink signals. The second part of intermediate BFW $C_2$ is determined by the second RU based on the second channel estimate $\hat{H}_2$ and on the reference signals received at the N2 antennas together with the second uplink signals. The method further comprises determining a second part of BFW based on the combined intermediate BFW $C_1+C_2$, and determining an estimation r of the K user-layer signals based on the combined intermediate signals $\tilde{y}_1+\tilde{y}_2$ and the second part of BFW.

According to another aspect, a first RU is provided that is operable in a distributed base station system of a wireless communication network, the first RU comprising N1 antennas. The distributed base station system further comprises a BBU connected to the first RU over a fronthaul link and a second RU connected to the first RU over an RU link. The second RU comprises N2 antennas. The first RU comprises a processing circuitry and a memory. Said memory contains instructions executable by said processing circuitry, whereby the first RU is operative for obtaining first uplink signals $y_1$ in frequency domain as received at the N1 antennas from a number of UEs, the first uplink signals $y_1$ comprising K user-layer signals in frequency domain overlaid with interference signals and noise, and obtaining a first channel estimate $\hat{H}_1$ of wireless communication channels $H_1$ in frequency domain between the number of UEs and the N1 antennas. The first RU is further operative for determining a first part of BFW for the first RU based on the first channel estimate $\hat{H}_1$ and on reference signals received at the N1 antennas together with the first uplink signals, the first part of BFW being used to reduce the N1 first uplink signals to K+M first intermediate signals $\tilde{y}_1$, where K+M is lower than N1, and determining the K+M first intermediate signals $\tilde{y}_1$ based on the N1 first uplink signals $y_1$ and on the first part of the BFW for the first RU. The first RU is further operative for determining a first part of intermediate BFW $C_1$ for interference cancellation at the BBU based on the first channel estimate $\hat{H}_1$ and on the reference signals received at the N1 antennas together with the first uplink signals. The first RU is further operative for receiving, from the second RU, K+M second intermediate signals $\tilde{y}_2$, the second intermediate signals being determined by the second RU based on second uplink signals $y_2$ in frequency domain as received at the N2 antennas of the second RU from the number of UEs and on a first part of BFW for the second RU determined by the second RU based on a second channel estimate $\hat{H}_2$ of wireless communication channels $H_2$ in frequency domain between the number UEs and the N2 antennas and on reference signals received at the N2 antennas together with the second uplink signals, the first part of BFW of the second RU being used to reduce the N2 second uplink signals to the K+M second intermediate signals $\tilde{y}_2$, where K+M is lower than N2. The first RU is further operative for receiving, from the second RU, a second part of intermediate BFW $C_2$ for interference cancellation, determined by the second RU based on the second channel estimate $\hat{H}_2$ and on the reference signals received at the N2 antennas together with the second uplink signals. The first RU is further operative for combining the first intermediate signals $\tilde{y}_1$ and the second intermediate signals $\tilde{y}_2$ into combined intermediate signals $\tilde{y}_1+\tilde{y}_2$, combining the first part of intermediate BFW $C_1$ and the second part of intermediate BFW $C_2$ into combined intermediate BFW $C_1+C_2$, and sending, to the BBU 110 over the fronthaul link, the combined intermediate signals $\tilde{y}_1+\tilde{y}_2$ and the combined intermediate BFW $C_1+C_2$.

According to another aspect, a BBU system is provided that is operable in a wireless communication network. The wireless communication network comprises a distributed base station system having a BBU, a first RU connected to the BBU over a fronthaul link, the first RU comprising N1 antennas, and a second RU connected to the first RU over an RU link, the second RU comprising N2 antennas. The BBU system comprises a processing circuitry and a memory. Said memory contains instructions executable by said processing circuitry, whereby the BBU system is operative for receiving, from the first RU, combined intermediate signals $\tilde{y}_1+\tilde{y}_2$ in frequency domain comprising first intermediate signals $\tilde{y}_1$ and second intermediate signals $\tilde{y}_2$. The first intermediate signals $\tilde{y}_1$ are determined by the first RU based on first uplink signals $y_1$ as received at the N1 antennas of the first RU from a number of UEs, the first uplink signals $y_1$ comprising K user-layer signals overlaid with interference signals and noise, and on first part of BFW for the first RU, determined by the first RU based on a first channel estimate $\hat{H}_1$ of wireless communication channels $H_1$ in frequency domain between the number UEs and the N1 antennas and on reference signals received at the N1 antennas together with the first uplink signals, the first part of BFW being used to reduce the N1 first uplink signals to K+M first intermediate signals $\tilde{y}_1$, where K+M is lower than N1. The second intermediate signals $\tilde{y}_2$ are determined by the second RU based on second uplink signals $y_2$ as received at the N2 antennas of the second RU from the number of UEs, the second uplink signals $y_2$ comprising K user-layer signals overlaid with interference signals and noise, and on first part of BFW for the second RU, determined by the second RU based on a second channel estimate $\hat{H}_2$ of wireless communication channels $H_2$ in frequency domain between the number of UEs and the N2 antennas, and on reference signals received at the N2 antennas together with the second uplink signals. The BBU system is further operative for receiving from the first RU, combined intermediate BFW $C_1+C_2$ comprising a first part of intermediate BFW $C_1$ and a second part of intermediate BFW $C_2$, the first part of intermediate BFW $C_1$ being determined by the first RU based on the first channel estimate $\hat{H}_1$ and on the reference signals received at the N1 antennas together with the first uplink signals, the second part of intermediate BFW $C_2$ being determined by the second RU based on the second channel estimate $\hat{H}_2$ and on the reference signals received at the N2 antennas together with the second uplink signals. The BBU system is further operative for determining a second part of BFW based on the combined intermediate BFW $C_1+C_2$, and for determining an estimation r of the K user-layer signals based on the combined intermediate signals $\tilde{y}_1+\tilde{y}_2$ and the second part of BFW.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Figure 1:
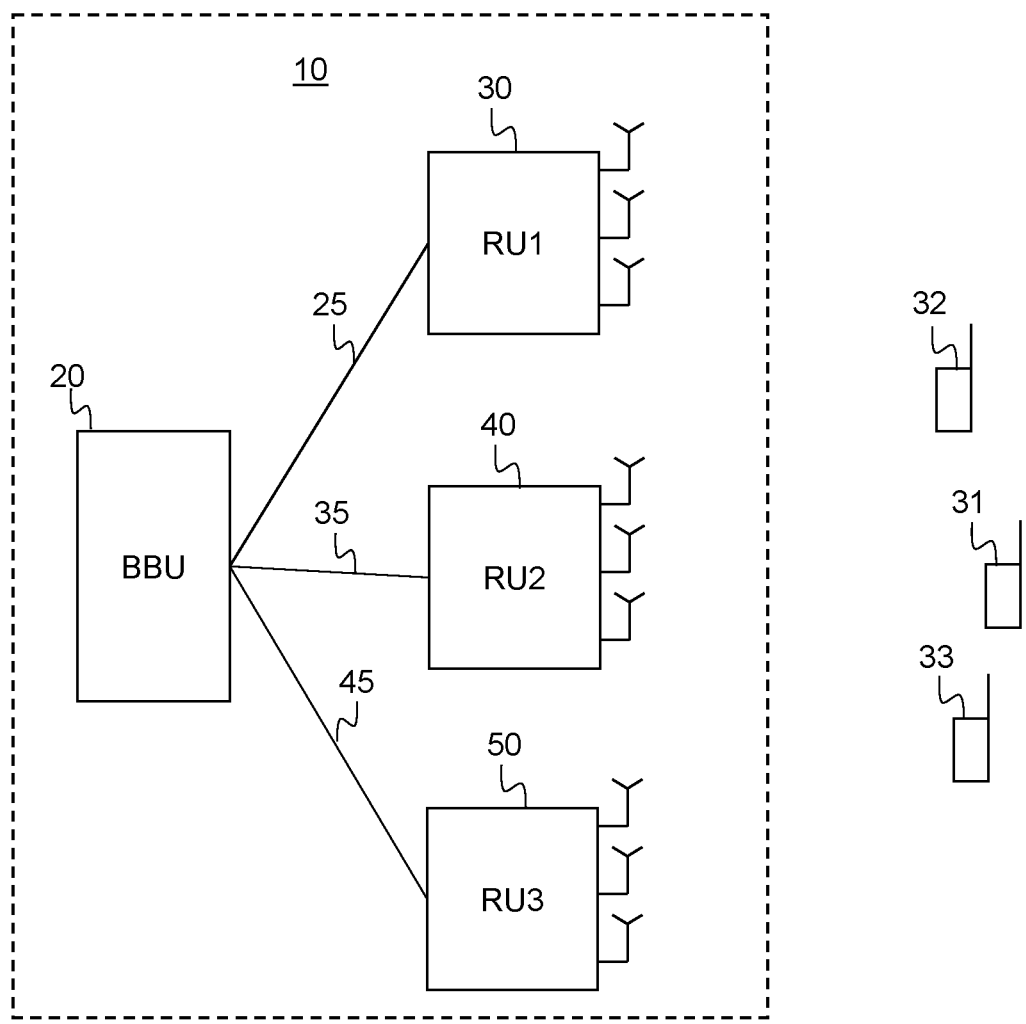
FIG. 1 is a block diagram illustrating a point-to-point topology of a distributed base station system comprising a plurality of RUs connected to a BBU.
Figure 2:
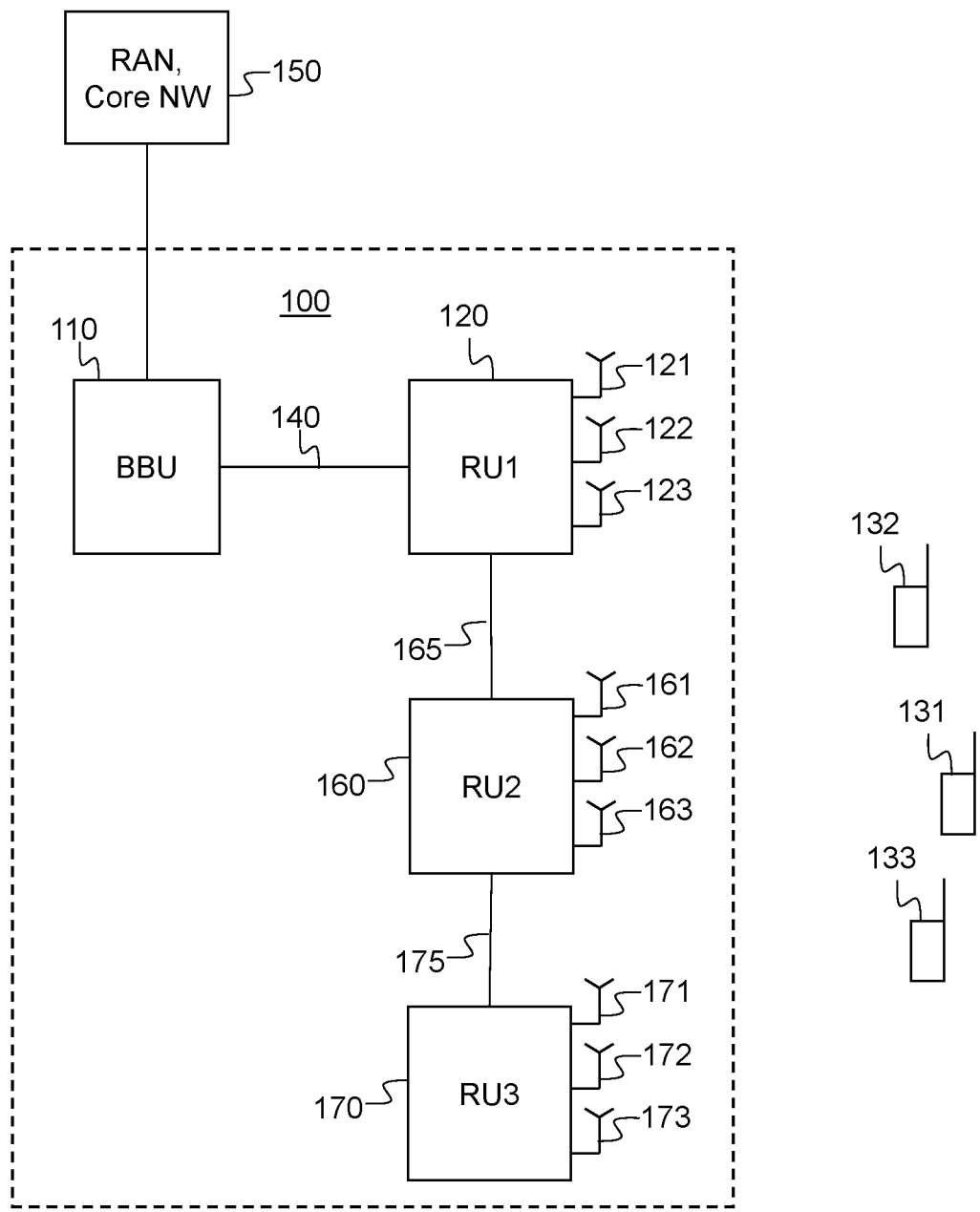
FIG. 2 is a block diagram illustrating a cascaded topology of a distributed base station system comprising a plurality of RUs connected to a BBU.

FIG. 2 illustrates a wireless communication network in which the present invention may be used. The wireless communication network comprises a distributed base station system 100, which in turn comprises a BBU 110 and a first RU 120. The BBU 110 has connections to other base station nodes or other RAN nodes and further to a core network (symbolized with 150 in FIG. 2) so that the distributed base station system 100 can communicate with other nodes of the communication network. The BBU 110 is connected to the first RU 120 via a fronthaul link 140. The fronthaul link 140 may be any kind of connection, such as a dedicated wireline or wireless connection or a connection via a network, as long as the connection fulfils fronthaul requirements, e.g. in capacity and latency. The first RU 120 further has a plurality of antennas 121, 122, 123 through which wireless signals are communicated towards and from one or more UEs 131, 132, 133. The wireless signals comprise data to be communicated from or to the UEs 131, 132, 133. The distributed base station system 100 further comprises a second RU 160 that is connected to the first RU 120 over an RU link 165. Observe that the second RU 160 has no direct connection to the BBU 110 but is connected to the BBU via the RU link 165, the first RU 120 and the fronthaul link 140. The second RU 160 further has a plurality of antennas 161, 162, 163 through which wireless signals are communicated towards and from the one or more UEs 131, 132, 133. The distributed base station system 100 may further comprise a third RU 170 that is connected to the second RU 160 over a second RU link 175. Observe that the third RU 170 has no direct connection to the BBU 110 but is connected to the BBU via the second RU link 175, the second RU 160, the RU link 165, the first RU 120 and the fronthaul link 140. The third RU 170 further has a plurality of antennas 171, 172, 173 through which wireless signals are communicated towards and from the one or more UEs 131, 132, 133. The distributed base station system 100 may comprise further RUs cascade-coupled onto the third RU 170 in a similar way.

The BBU 110 and the first RU 120, second RU 160 and third RU 170 and any possible other RUs each comprise RAN functionality for handling the data and signals to be communicated between the BBU 110, the RUs 120, 160, 170 and the UEs 131, 132, 133. The RAN functionality is distributed between the BBU 110 and the RUs as will be described further down in this disclosure. It can be noted that in 3GPP, the BBU can be further split to two units called Distributed Unit (DU) and Central Unit (CU), where the DU is arranged to perform lower layer processing, e.g. L1 and L2 of the BBU, and the CU is arranged to perform higher layer processing of the BBU, e.g. L3 and higher. Note that the BBU and the RU are referred to as O-DU and O-RU, respectively, in O-RAN. In eCPRI terminologies, the BBU and the RU are referred to as eREC (eCPRI Radio Equipment Control) and eRE (eCPRI Radio Equipment), respectively. In another terminology, the BBU and the RU may be referred to as LLS-CU and LLS-DU, respectively.

The wireless communication network 100 may be any kind of wireless communication network that can provide radio access to wireless devices. Example of such wireless communication networks are networks based on Global System for Mobile communication (GSM), Enhanced Data Rates for GSM Evolution (EDGE), Universal Mobile Telecommunications System (UMTS), Code Division Multiple Access 2000 (CDMA 2000), Long Term Evolution (LTE), LTE Advanced, Wireless Local Area Networks (WLAN), Worldwide Interoperability for Microwave Access (WiMAX), WiMAX Advanced, as well as fifth generation (5G) wireless communication networks based on technology such as New Radio (NR), and any possible future sixth generation (6G) wireless communication network.

The UEs 131, 132, 133 may be any type of communication device capable of wirelessly communicating with the RUs 120, 160, 170 using radio signals. For example, the UEs may be a machine type UE or a UE capable of machine to machine (M2M) communication, a sensor, a tablet, a mobile terminal, a smart phone, a laptop embedded equipped (LEE), a laptop mounted equipment (LME), a USB dongle, a Customer Premises Equipment (CPE) etc. The UE may also be called a wireless communication device or wireless device.

Figure 3:
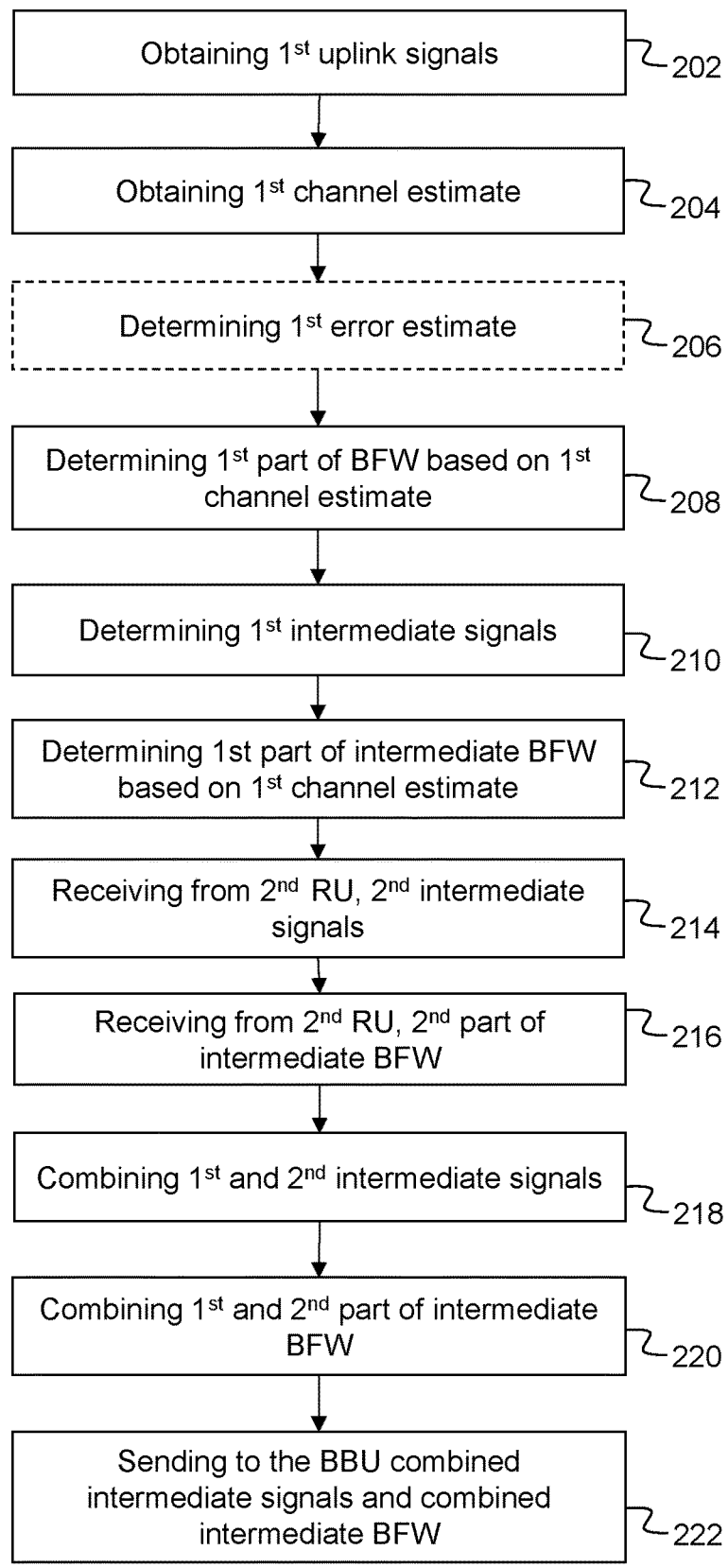
FIG. 3 is a flow chart illustrating a method performed by a first RU, according to possible embodiments.

FIG. 3, in conjunction with FIG. 2, describes a method performed by a first RU 120 of a distributed base station system 100, the first RU 120 comprising N1 antennas 121, 122, 123. The distributed base station system 100 further comprises a BBU 110 connected to the first RU 120 over a fronthaul link 140 and a second RU 160 connected to the first RU 120 over an RU link 165, the second RU comprising N2 antennas 161, 162, 163. The method comprises obtaining 202 first uplink signals $y_1$ in frequency domain as received at the N1 antennas 121, 122, 123 from a number of UEs 131, 132, 133, the first uplink signals $y_1$ comprising K user-layer signals in frequency domain overlaid with interference signals and noise. The method further comprises obtaining 204 a first channel estimate $\hat{H}_1$ of wireless communication channels $H_1$ in frequency domain between the number of UEs 131, 132, 133 and the N1 antennas 121, 122, 123, and determining 208 a first part of beamforming weights (BFW) for the first RU based on the first channel estimate $\hat{H}_1$ and on reference signals received at the N1 antennas together with the first uplink signals, the first part of BFW being used to reduce the N1 first uplink signals to K+M first intermediate signals $\tilde{y}_1$, where K+M is lower than N1. The method further comprises determining 210 the K+M first intermediate signals $\tilde{y}_1$ based on the N1 first uplink signals $y_1$ and on the first part of the BFW for the first RU, and determining 212 a first part of intermediate BFW $C_1$ for interference cancellation at the BBU based on the first channel estimate $\hat{H}_1$ and on the reference signals received at the N1 antennas together with the first uplink signals. Further, the method comprises receiving 214, from the second RU 160, K+M second intermediate signals $\tilde{y}_2$, the second intermediate signals being determined by the second RU based on second uplink signals $y_2$ in frequency domain as received at the N2 antennas 161, 162, 163 of the second RU from the number of UEs 131, 132, 133 and on a first part of BFW for the second RU determined by the second RU based on a second channel estimate $\hat{H}_2$ of wireless communication channels $H_2$ in frequency domain between the number UEs 131, 132, 133 and the N2 antennas 161, 162, 163 and on reference signals received at the N2 antennas together with the second uplink signals, the first part of BFW of the second RU being used to reduce the N2 second uplink signals to the K+M second intermediate signals $\tilde{y}_2$, where K+M is lower than N2. The method further comprises receiving 216, from the second RU 160, a second part of intermediate BFW $C_2$ for interference cancellation, determined by the second RU based on the second channel estimate $\hat{H}_2$ and on the reference signals received at the N2 antennas together with the second uplink signals. The method further comprises combining 218 the first intermediate signals $\tilde{y}_1$ and the second intermediate signals $\tilde{y}_2$ into combined intermediate signals $\tilde{y}_1+\tilde{y}_2$, combining 220 the first part of intermediate BFW $C_1$ and the second part of intermediate BFW $C_2$ into combined intermediate BFW $C_1+C_2$, and sending 222, to the BBU 110 over the fronthaul link 140, the combined intermediate signals $\tilde{y}_1+\tilde{y}_2$ and the combined intermediate BFW $C_1+C_2$.

When such a method and a cascaded topology is used, the required fronthaul capacity over the fronthaul link can be kept on a level that is the same as the required fronthaul capacity for each link in a star topology using the method presented in WO2020/130895. In other words, due to the combining of the first and second intermediate signals, the combined intermediate signals keep the same dimension as a single intermediate signal. Further due to the combining of the first and second intermediate BFW, the combined intermediate BFW keep the same dimension as intermediate BFW from one RU. Also, the dimension of the combined intermediate signal and the combined intermediate BFW keep the same dimension even if the number of cascaded RUs increase.

The "interference signals" are signals originating from UEs wirelessly connected to other base stations or base station systems than this base station system. The K user-layer signals use the same time-frequency resource when transmitted wirelessly from the UEs to the respective RU. N1 and N2 in "N1/N2 antennas" are integers larger than or equal to 2. The first and second channel estimate are based on reference signals sent by the UEs 131, 132, 133 towards the respective first and second RU, and how the sent reference signals are received at the respective first and second RU compared to what they looked like when they were sent. The first uplink signals $y_1$, as well as the second uplink signals $y_2$, can be modelled as a vector where each vector element represents the received signal at each antenna among the N1 or N2 antennas. One channel estimate $\hat{H}$ is determined for a limited time period and frequency range. According to an embodiment, the channel is estimated for each resource block (RB). In this embodiment there are many channel estimates determined, for example, the LTE 20 MHz range has 100 RBs and the NR 100 MHz has 273 RBs with subcarrier spacing of 30 kHz.

The main purpose for the determining of first intermediate signals using the first part BFWs is to reduce the number of streams from N1 to K+M, where K is the number of layers and M is a number representing the additional degrees of freedom kept for handling a number of co-channel interferences from other cells, i.e. signals from UEs connected to other base stations. Basically, K degrees of freedom is used to cancel out the intra interferences between the number of UEs and M degrees of freedom is used to mitigate the inter-cell interferences from other cells. To achieve the best performance, M is a design parameter that should be larger than the number of dominant inter-cell interferences.

The combining 218 signifies adding the first and second intermediate signals elementwise so that there will be the same amount of elements in the combined signal as in each of the intermediate signals. The combining 220 signifies adding the first and second part of intermediate BFW elementwise so that there will be the same amount of elements in the combined intermediate BFW as in each of the first and second intermediate BFW.

According to an embodiment, the method further comprises determining 206 a first error estimate $G_1$ based on the obtained first channel estimate $\hat{H}_1$ and on the reference signals $y_{ref,m,1}$ received at the N1 antennas from the number of UEs 131, 132, 133 together with the first uplink signals, the received reference signals having $\tilde{M}$ symbols for m=1, ..., $\tilde{M}$, where $\tilde{M} \geq M$, and wherein the first part of the BFW for the first RU as well as the first part of the intermediate BFW are determined 208, 212 based also on the first error estimate $G_1$.

In this embodiment, the first part of the BFW for the first RU as well as the first part of the intermediate BFW are determined not only based on the first channel estimate $\hat{H}_1$ but also on the first error estimate $G_1$. By such an error estimate, the interferences from other UEs connected other base stations than the described base station system is better handled since the error estimate contains the information of the interferences and noises which are utilized here to mitigate the interferences. Further, the received second intermediate signals $\tilde{y}_2$, and the received second part of the intermediate BFW for the second RU were determined by the second RU based also on a second error estimate $G_2$ based on the second channel estimate $\hat{H}_2$ and on the reference signals $y_{ref,m,2}$ as received at the N2 antennas from the number of UEs 131, 132, 133 together with the second uplink signals.

According to an embodiment, the first error estimate $G_1$ is determined 206 as $$G_1 = \frac{1}{\sqrt{M}}[\hat{g}_{1,1} \ \ldots \ \hat{g}_{M,1}],$$

where $\hat{g}_{m,1} = y_{ref,m,1} - \hat{H} x_{ref,m}$ for m=1, ..., $\tilde{M}$, wherein $x_{ref,m}$ is the reference signals as sent from the number of UEs.

According to another embodiment, the determining 210 of the first intermediate signals $\tilde{y}_1$ comprises multiplying the first uplink signals $y_1$ with the transpose and conjugate $A_1^*$ of a first extended channel estimate $A_1$, which is obtained based on the first channel estimate $\hat{H}_1$ and the first error estimate $G_1$. Therefore, the extend channel represents both the channel information and the information regarding interferences. In other words, the first part of the BFW makes the uplink signals from the N1 antennas co-phased with relation to the extended channel estimate before the combining of the intermediate signals, so hereby the uplink signals from the N1 antennas are combined coherently in phase. Further, in the second RU, the second intermediate signals $\tilde{y}_2$ were determined by the second RU by multiplying the second uplink signals $y_2$ with the transpose and conjugate $A_2^*$ of a second extended channel estimate $A_2$, which is obtained based on the second channel estimate $\hat{H}_2$ and the second error estimate $G_2$.

According to another embodiment, the first part of the intermediate BFW $C_1$ are determined 212 by multiplying a transpose and conjugate $A_1^*$ of a first extended channel estimate $A_1$, which is obtained based on the first channel estimate $\hat{H}_1$ and the first error estimate $G_1$, with the first extended channel estimate $A_1$. Further, in the second RU, the second part of the intermediate BFW $C_2$ are determined by multiplying a transpose and conjugate $A_2^*$ of a second extended channel estimate $A_2$, which is obtained based on the second channel estimate $\hat{H}_2$ and the second error estimate $G_2$, with the second extended channel estimate $A_2$.

Figure 4:
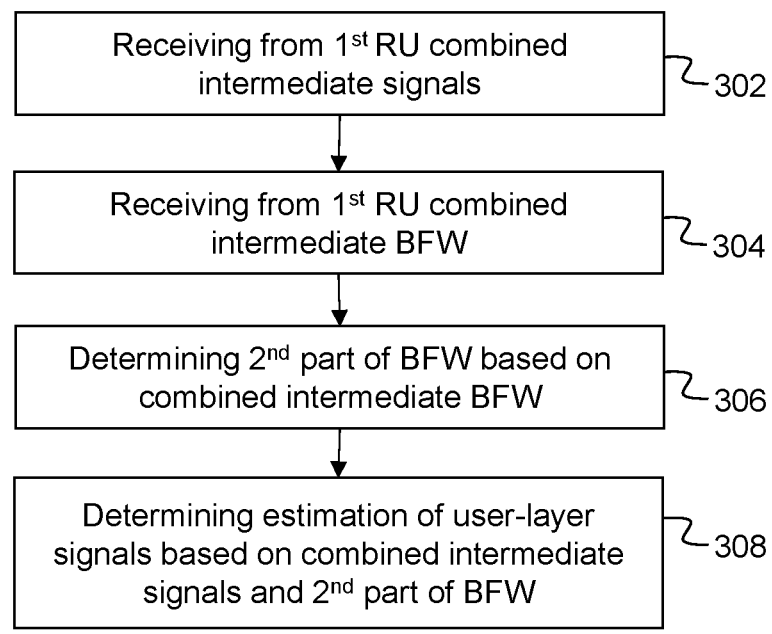
FIG. 4 is a flow chart illustrating a method performed by a BBU system, according to possible embodiments.

FIG. 4, in conjunction with FIG. 2, describes a method performed by a BBU system 700 of a wireless communication network, the wireless communication network comprising a distributed base station system 100 having a BBU 110, a first RU 120 connected to the BBU 110 over a fronthaul link 140, and a second RU 160 connected to the first RU 120 over an RU link 165. The first RU comprises N1 antennas 121, 122, 123 and the second RU comprises N2 antennas 161, 162, 163. The method comprises receiving 302, from the first RU 120, combined intermediate signals $\tilde{y}_1 + \tilde{y}_2$ in frequency domain comprising first intermediate signals $\tilde{y}_1$ and second intermediate signals $\tilde{y}_2$. The first intermediate signals $\tilde{y}_1$ are determined by the first RU 120 based on first uplink signals $y_1$ as received at the N1 antennas 121, 122, 123 of the first RU from a number of UEs 131, 132, 133. The first uplink signals $y_1$ comprise K user-layer signals overlaid with interference signals and noise. The first intermediate signals are further determined based on a first part of BFW for the first RU, determined by the first RU based on a first channel estimate $\hat{H}_1$ of wireless communication channels $H_1$ in frequency domain between the number UEs 131, 132, 133 and the N1 antennas 121, 122, 123, and on reference signals received at the N1 antennas together with the first uplink signals. The first part of BFW is used to reduce the N1 first uplink signals to K+M first intermediate signals $\tilde{y}_1$, where K+M is lower than N1. The second intermediate signals $\tilde{y}_2$ are determined by the second RU 160 based on second uplink signals $y_2$ as received at the N2 antennas 161, 162, 163 of the second RU from the number of UEs 131, 132, 133. The second uplink signals $y_2$ comprise K user-layer signals overlaid with interference signals and noise. The second intermediate signals are further determined based on first part of BFW for the second RU, determined by the second RU based on a second channel estimate $\hat{H}_2$ of wireless communication channels $H_2$ in frequency domain between the number of UEs 131, 132, 133 and the N2 antennas 161, 162, 163, and on reference signals received at the N2 antennas together with the second uplink signals. The method further comprises receiving 304 from the first RU 120, combined intermediate BFW $C_1 + C_2$ comprising a first part of intermediate BFW $C_1$ and a second part of intermediate BFW $C_2$. The first part of intermediate BFW $C_1$ is determined by the first RU 120 based on the first channel estimate $\hat{H}_1$ and on the reference signals received at the N1 antennas together with the first uplink signals. The second part of intermediate BFW $C_2$ is determined by the second RU 160 based on the second channel estimate $\hat{H}_2$ and on the reference signals received at the N2 antennas together with the second uplink signals. The method further comprises determining 306 a second part of BFW based on the combined intermediate BFW $C_1 + C_2$, and determining 308 an estimation r of the K user-layer signals based on the combined intermediate signals $\tilde{y}_1 + \tilde{y}_2$ and the second part of BFW.

The BBU system 700 of the wireless communication network that performs the method may be the BBU 110, a unit in the BBU or in the distributed base station system 100. Alternatively, the BBU system 700 that performs the method may be arranged in or at any other network node of the communication network, such as a node further away from the UEs, e.g. another network element in the RAN or close to the RAN or another RAN node. In this alternative, and in the cloud-solution embodiment discussed below, the BBU 110 receives, from the first RU 120 the combined intermediate signals $\tilde{y}_1 + \tilde{y}_2$ and the combined intermediate BFW $C_1 + C_2$, and communicates the combined intermediate signals $\tilde{y}_1 + \tilde{y}_2$ and the combined intermediate BFW $C_1 + C_2$ to the other network node that determines 306, 308 the second part of the BFW as well as the estimation r of the K user-layer signals. Alternatively, the BBU system 700 that performs the method may be a group of network nodes, wherein functionality for performing the method is spread out over different physical, or virtual, nodes of the network. The latter may be called a "cloud-solution".

According to an embodiment, the determining 306 of the second part of the BFW comprises determining the second part of BFW based on the inverse of the combined intermediate BFW $C_1 + C_2$.

According to an embodiment, the second part of BFW is determined 306 as the first K rows of the inverse of the combined intermediate BFW $C_1 + C_2$.

According to another embodiment, the estimation r of the K user-layer signals is determined 308 by multiplying the combined intermediate signals $\tilde{y}_1+\tilde{y}_2$ with the second part of BFW.

In the following, a model of an embodiment of a cascaded base station system such as the one shown in FIG. 2 is described. In this system, consider an exemplified scenario with K user layers, where K UEs are served in a cell and each UE has one antenna and one user layer, and L RUs in the local area cascade-coupled to a BBU in a daisy chain serving the K UEs in the cell. Note that one UE can have more than one antenna and more than one user layer. The RUs may effectively form a large antenna array serving one cell. The first RU in the chain, i.e. RU 1 is the one with fronthaul interface connecting to the BBU. In antenna-element domain or beam/direction domain, the uplink channel between the antennas of the K UEs and the $N_l$ antennas or beams of RU l (for k=1, . . . , L) is denoted as $H_l \in \mathbb{C}^{N_l \times K}$. The effective large antenna array has therefore $\Sigma_{l=1}^{L} N_l$ antenna elements in total. The effective uplink channel between the antennas of the K UEs and the combined effective antenna array comprising L RUs will be $$H = \begin{bmatrix} H_1 \\ \vdots \\ H_L \end{bmatrix} \in \mathbb{C}^{(\Sigma_{l=1}^{L} N_l) \times K}$$

If interference-rejection combining (IRC) is conducted regarding the effective antenna array, the equalizer can be expressed as $$W_{IRC}=H^*(HH^*+R)^{-1} \quad (1)$$

where R is the estimated covariance matrix of interference-and-noise and H* is the transpose and conjugate of the effective uplink channel matrix H. One way to estimate R is to use the interference-and-noise signals. As shown in WO2020/130895, the equalizer, aka IRC matrix, can be transformed into $$W_{IRC}=\Lambda_K(A^*A)^{-1}A^*$$

where A=[H G], A is an extended channel estimate, A* is the transpose and conjugate of the extended channel matrix A, and G is the error estimate. G can be composed in at least three different ways based on an error matrix obtained from reference signals such as demodulation reference signals (DMRS). The three different ways will be detailed further down in this disclosure. The $\Lambda_K$ denotes the first K rows of a (K+M)×(K+M) identity matrix, where M is the number of column vectors in G. Regarding the L RUs that form the effective antenna array, the extended channel estimate A can be described as $$A = \begin{bmatrix} A_1 \\ \vdots \\ A_L \end{bmatrix} = \begin{bmatrix} H_1 & G_1 \\ \vdots & \vdots \\ H_L & G_L \end{bmatrix} \in \mathbb{C}^{(\Sigma_{l=1}^{L} N_l) \times (K+M)}$$

where $G_l \in \mathbb{C}^{N_l \times M}$ and $A_l \in \mathbb{C}^{N_l \times (K+M)}$.

Therefore, the overall IRC beamforming weights (BFWs) can be decomposed as $$W_{IRC} = \underbrace{\Lambda_K \left( \sum_{l=1}^{L} A_l^* A_l \right)^{-1}}_{BBU} \underbrace{[A_1^* \cdots A_L^*]}_{RUs} \quad (2)$$

Figure 5:
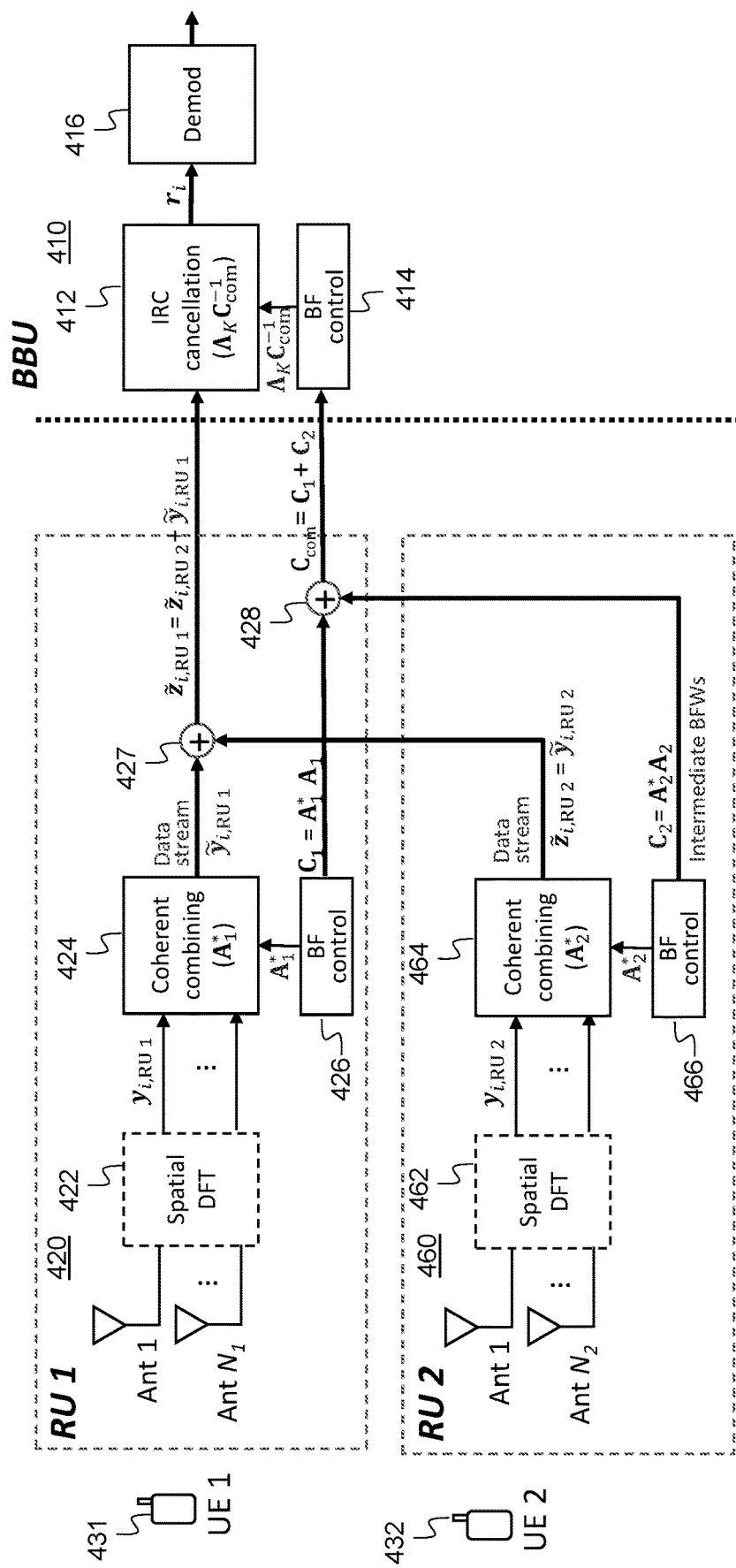
FIG. 5 is a block diagram in more detail of a possible realization of a distributed base station system for UL communication having two cascade-coupled RUs according to the present invention.

Here the first part of the BFWs, $[A_1^* \ldots A_L^*]$, represents the beamforming weights used in the RUs where each individual RU l uses the corresponding submatrix of $A_l^*$ as the first part of BFWs used by RU l for the first beamforming of the UL received signal. The second part of the BFWs $\Lambda_K(\Sigma_{l=1}^{L} A_l^* A_l)^{-1}$ are determined in the BBU based on combined intermediate BFWs $\Sigma_{l=1}^{L} A_l^* A_l$ to perform inter-ference cancellation of the UL signals received from all RUs. After these two steps of the beamforming using two parts of the BFWs in the RUs and the BBU, respectively, the interferences between user-layer signals are mitigated according to the derived IRC criteria. Furthermore, to reduce the amount of data in the cascaded RU chain sent over the fronthaul link FH (140 in FIG. 2), each RU in the cascaded chain combines its own beamformed signal, which is also referred to as intermediate signal, with the combined beamformed signals of all previous RUs in the chain, which are received from the previous RU in the chain, and then forwards the combined signal further to the next RU in the chain. Each RU also combines its own intermediate BFWs of $A_l^*A_l$ with the combined intermediate BFWs of all previous RUs in the chain, which are received from the previous RU in the chain, and then forwards the combined intermediate BFWs to the next RU. After receiving the combined coefficients from the first RU in the chain connected to BBU, the BBU calculates the second part of BFWs, based on the received combined intermediate BFWs as $\Lambda_K(\Sigma_{l=1}^{L} A_l^* A_l)^{-1}$, and apply the second part of the BFWs to the combined signal received from the first RU. FIG. 5 illustrates the case of 2 cascaded RUs and FIG. 6 the case of L cascaded RUs.

In FIG. 5, the uplink signals sent by the UEs 431, 432 are received at the $N_1$ antennas of RU1 420 and at the $N_2$ antennas of RU2 460. In FIG. 5, without loss of generality, we directly model the system in frequency domain, where the conversion from time-domain signals to frequency-domain signals is not shown. An optional spatial discrete Fourier Transformation (DFT) unit 422, 462 transforms the frequency-domain uplink signals from antenna-element domain to beam domain, which can be used to improve signal SNR of the strong beams. Basically, the signals received at N antennas are transformed to the signals of N beams. The i-th received uplink signal in frequency domain at the first RU 420 is denoted as $y_{i,RU\ 1} \in \mathbb{C}^{N_1 \times 1}$, and the i-th received uplink signal in frequency domain at the second RU 460 is denoted as $y_{i,RU\ 2} \in \mathbb{C}^{N_2 \times 1}$. Then, at the first RU, the channel estimation $\hat{H}_1$ of the channel $H_1$ between the first RU 420 and the UEs 431, 432 is obtained. Similarly, the channel estimation $\hat{H}_2$ of the channel $H_2$ between the second RU 460 and the UEs 431, 432 is obtained. In case of IRC, the error matrix is also estimated and the error estimate $G_1$ for the first RU and $G_2$ for the second RU are derived accordingly to compose the extended channel coefficients $A_1=[\hat{H}_1\ G_1]$ and $A_2=[\hat{H}_2\ G_2]$ for the respective first and second RU. This may be performed in a respective unit called beamforming (BF) control unit 426, 466 of the respective first and the second RU. Further, at the respective BF control unit 424, 464 of the first and the second RU, the respective transpose and conjugate $A_1^*$ and $A_2^*$ of the extended channel coefficient matrix $A_1$ and $A_2$ are determined. Then, at a coherent combining unit 422 of the first RU 420, the received uplink signals $y_{i,RU\ 1}$ are multiplied with the transpose and conjugate $A_1^*$ of the first extended channel coefficient matrix $A_1$ to implement coherent combining. Similarly, at a coherent combining unit 462 of the second RU 460, the received uplink signals $y_{i,RU\ 2}$ are multiplied with the transpose and conjugate $A_2^*$ of the second extended channel coefficient matrix $A_2$ to implement coherent combining. This is the first part of the beamforming and it is as shown performed in the respective RU. As a result, first intermediate signals $\tilde{y}_{i,RU\ 1}$ and second intermediate signals $\tilde{y}_{i,RU\ 2}$ are achieved at the first and the second RU, respectively.

Besides receiving uplink signals from its $N_1$ antenna elements, the first RU 420 receives the second intermediate signals $\tilde{y}_{i,RU\ 2}$ from the second RU 460, which the second RU 460 sends over the RU link 165 (see FIG. 2). The first RU 420 combines in a combiner 427, its first intermediate signals $\tilde{y}_{i,RU\ 1}$ with the second intermediate signals $\tilde{y}_{i,RU\ 2}$ received from the second RU 460 into combined intermediate signals $\tilde{z}_{i,RU\ 1}$, as $\tilde{z}_{i,RU\ 1}=\tilde{y}_{i,RU\ 2}+\tilde{y}_{i,RU\ 1}$. The combined intermediate signals $\tilde{z}_{i,RU\ 1}$ are then forwarded over the fronthaul link to the BBU 410.

The first RU 420 further determines in its BF control unit 426 first intermediate BFWs $C_1=A_1*A_1$. Similarly, the second RU 460 determines in its BF control unit 466 second intermediate BFWs $C_2=A_2*A_2$. The second RU 460 sends the second intermediate BFWs $C_2$ over the first RU link to the first RU, where they are combined in a combiner 428 with the first intermediate BFWs $C_1$ into combined intermediate BFWs $C_{com}=C_1+C_2$. The combined intermediate BFWs are then sent over the fronthaul link to the BBU 410. Note that the use of separate BF control units 426, 466 in each RU that is in charge of calculating $A_l*$ and $A_l*A_l$ is mainly for illustration purposes. The actual implementation can look different. For example, the BF control unit and Coherent Combining unit may be one and the same unit.

The BBU 410 then receives the combined intermediate signals $\tilde{z}_{i,RU\ 1}$ and the combined intermediate BFWs $C_{com}$. A BF control unit 414 of the BBU determines a second part of BFW as $\Lambda_K C_{com}^{-1}$ which means the first K rows of an inverse of the combined intermediate BFWs matrix. The first K rows of $C_{com}^{-1}$ can be obtained efficiently by sub-block matrix inverse. Represent $C_{com}$ in four sub-block matrices as $$C_{com} = \begin{bmatrix} B_1 & B_3 \\ B_2 & B_4 \end{bmatrix}$$

where $B_1$ is a K×K sub-block matrix, $B_2$ is a M×K sub-block matrix, $B_3$ is a K×M sub-block matrix and $B_4$ is a M×M sub-block matrix. According to the block matrix inversion property, the first K rows of $C_{com}^{-1}$ can be derived as $$\Lambda_K C_{com}^{-1} = [(B_1-B_3B_4^{-1}B_2)^{-1}\ -(B_1-B_3B_4^{-1}B_2)^{-1}B_3B_4^{-1}]$$

To perform matrix inversion is rather computationally heavy, especially if there are many antennas. To leave this calculation to the BBU would save computational resources at the RUs. The IRC equalization can then be implemented easily in an IRC cancellation unit 412 in the BBU 410 in order to obtain a good estimation r of the K user layer signals as follows:

$$r_i = \Lambda_K C_{com}^{-1} \tilde{z}_{i,RU\ 1}$$

The estimation r of the K user layer signals is then posttreated e.g. by being demodulated in a demodulator 416.

Figure 6:
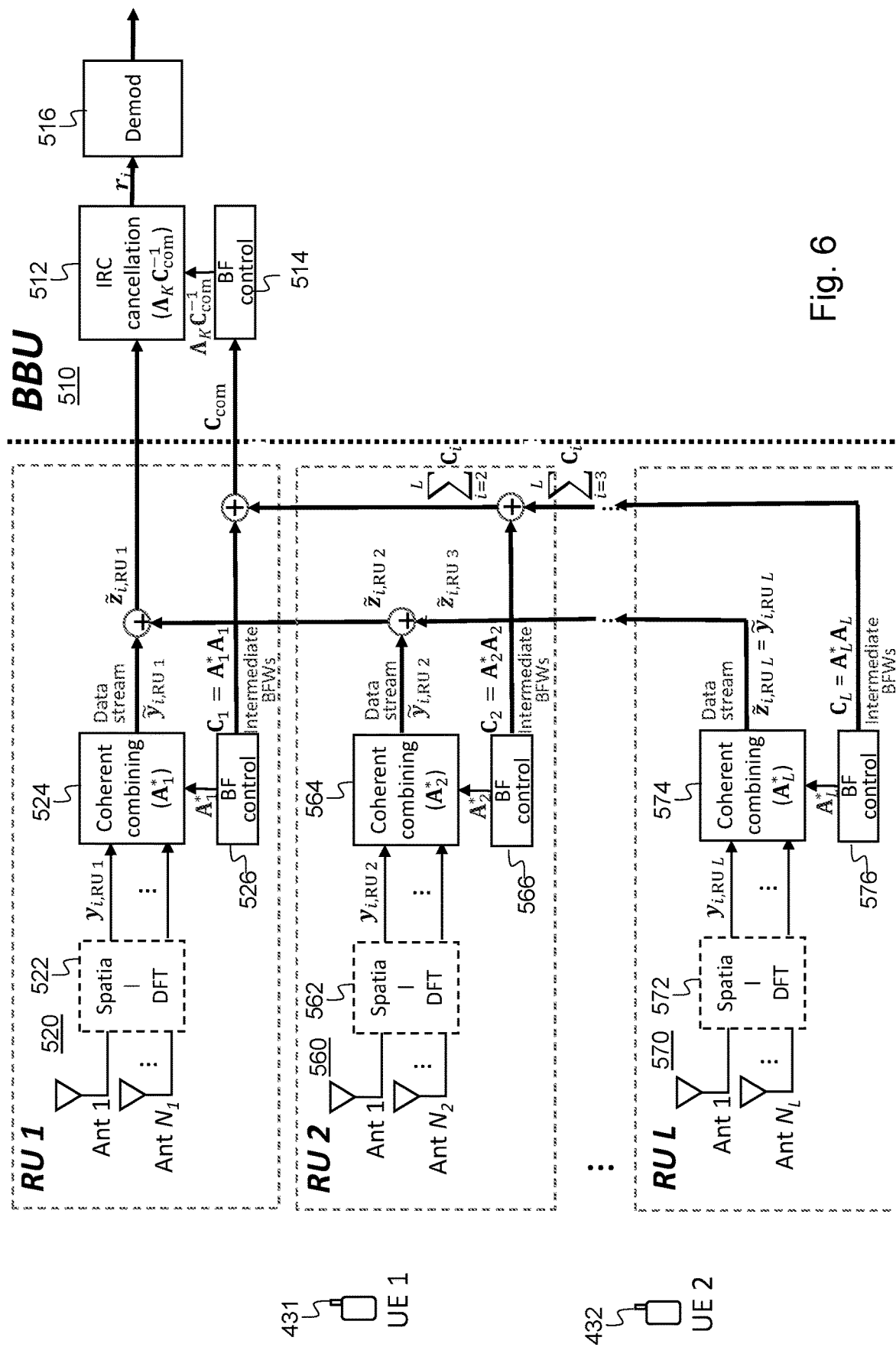
FIG. 6 is a block diagram in more detail of a possible realization of a distributed base station system for UL communication having L cascade-coupled RUs according to the present invention.

With reference to FIG. 6, a more general embodiment is provided when having L cascade coupled RUs. At the RUs 520, 560, 570 of FIG. 6, the operations described below are performed. Same as in FIG. 5, without loss of generality, in FIG. 6, we directly model the system in frequency domain, where the conversion from time-domain signal to frequency-domain signal is not shown. The optional spatial discrete Fourier Transformation (DFT) unit 422, 462, 472 of the respective RU transforms the frequency-domain uplink signal from antenna-element domain to beam domain, which can be used to improve signal SNR of the strong beams. Basically, the signals received at N antennas are transformed to the signals of N beams. At the RU l for l=1, ..., L, the i-th received uplink signal in frequency domain is denoted as $y_{i,RU\ l} \in \mathbb{C}^{N_l \times 1}$. The channel estimation $\hat{H}_l$ of the channel $H_l$ between RU l 520, 560, 570 and the UEs 431, 432 is obtained at the respective BF control unit 526, 566, 576. In case of IRC, the error estimation $G_l$ is determined accordingly to compose the extended channel coefficients $A_l=[\hat{H}_l\ G_l]$.

The transpose and conjugate of the extended channel coefficients $A_l*$ of the respective RU are determined in the BF control unit 526, 566, 576 of the respective RU 520, 560, 570. Thereafter in a coherent combining unit 524, 564, 574 of the respective RU 520, 560, 570, the respective received uplink signals of each RU $y_{i,RU\ l} \in \mathbb{C}^{N_l \times 1}$ are multiplied with the transpose and conjugate of the extended channel coefficients $A_l*$ to implement coherent combining in the respective RU, i.e. to determine the first part of the BFW in the respective RU regarding the extended channel coefficients as $$\tilde{y}_{i,RU\ l} = A_l* y_{i,RU\ l}$$

Generally, $y_{i,RU\ l} \in \mathbb{C}^{(K+M) \times 1}$ is the processed received uplink signal at RU l, called intermediate signal or signals.

Besides receiving uplink data signals from the antenna elements, RU l also receives forwarded data streams, i.e. intermediate signals and intermediate BFWs from RU (l+1) if l<L. In other words, RU l receives forwarded intermediate signals and intermediate BFWs from all RUs that are positioned further away from the BBU in the cascaded chain than RU l. Let $\tilde{z}_{i,RU\ (l+1)} \in \mathbb{C}^{(K+M) \times 1}$ denote the forwarded intermediate signals where $\tilde{z}_{i,RU\ L}=\tilde{y}_{i,RU\ L}=A_L* y_{i,RU\ L}$, and let $\Sigma_{i=l+1}^L C_i \in \mathbb{C}^{(K+M) \times (K+M)}$ denote the forwarded intermediate BFWs where $C_i=A_i*A_i$ from RU (l+1). RU l will combine the forwarded intermediate signals together with its own processed intermediate signal $\tilde{y}_{i,RU\ l}$ into combined intermediate signals $\tilde{z}_{i,RU\ l}$ as $$\tilde{z}_{i,RU\ l} = \tilde{z}_{i,RU(l+1)} + \tilde{y}_{i,RU\ l}$$

Then RU l forwards the combined intermediate signals $\tilde{z}_{i,RU\ l}$ to RU (l−1) if l>1.

In addition, RU l will determine, in its BF control unit 526, 566, 576, its own intermediate BFWs as $A_l*A_l$. The own intermediate BFW are then combined with the forwarded intermediate BFWs from the RUs further down the cascaded chain into updated aka combined intermediate BFWs as $\Sigma_{i=l}^L C_i$. The combined intermediate BFWs $\Sigma_{i=l}^L C_i$ at RU l are also forwarded to RU (l−1) if l>1. The above process repeats at every RU in the cascade until the data stream and coefficients reach RU 1 520. RU 1 combines the intermediate data streams and intermediate BFWs one more time and sends $\tilde{z}_{i,RU\ 1}$ and $C_{com}=\Sigma_{i=1}^L C_i$ over the fronthaul interface to the BBU 510.

Note that in FIG. 6, there is a BF control block in each RU that is in charge of calculating $A_l*$ and $A_l*A_l$. This is only for illustration purposes. The actual implementation can look different.

The BBU 510 then receives the combined intermediate signals $\tilde{z}_{i,RU\ 1}$ and the combined intermediate BFWs $C_{com}$ from the first RU 520 over the fronthaul link. The process of the BBU 510 and its sub-units IRC cancellation 512, BF control 514 and demodulator 516 are the same or substantially the same as in the BBU 410 of FIG. 5 and the corresponding subunits of the BBU of FIG. 5.

For determining the error estimate $G_l$, at the RU l for l=1, ..., L, there are several different methods that can be used. Below are three methods presented as three possible embodiments. According to a first embodiment, once the desired channel $H_l$ is estimated using a reference signal, e.g. DMRS-signal, $x_{ref,m}$, with M known reference symbols for m=1, ..., M, sent by the UEs, an $N_l \times M$ matrix of the error estimate $G_l$ can be composed as $$G_l = 1/\sqrt{M}[\hat{g}_{1,l} \ldots \hat{g}_{M,l}]$$

where $\hat{g}_{m,l} = y_{ref,m,l} - \hat{H}_l x_{ref,m}$, for m=1, ..., M, and $y_{ref,m,RU\ l}$ are the reference signals as received at the antennas of RU l.

According to a second embodiment, the error estimate is determined like in the first embodiment as $\tilde{G}_l = 1/\sqrt{\tilde{M}}$ $[\hat{g}_{1,l} \ldots \hat{g}_{\tilde{M},l}]$ where $\tilde{M} > M$. Then singular value decomposition (SVD), or a principal component analysis (PCA)-based method, or similar method is conducted to obtain singular values and left singular vectors of $\tilde{G}_l$. The M largest singular values are then used to compose a diagonal matrix $\Sigma_M$ and the left singular vectors associating with the M largest eigenvalues are used to compose an $N_l \times M$ matrix $U_M$. Then $G_l$ is obtained as $G_l = U_M \Sigma_M$.

According to a third embodiment, the estimated covariance matrix of interference-and-noise R mentioned in Equation (1) can be estimated by the RU l in various ways under different estimation criteria, e.g. lease square (LS), minimum mean square error (MMSE), linear minimum mean square error (LMMSE) etc., based on, for example, reference signals like sounding reference signal (SRS), DMRS, and other information like signal-to-interference-and-noise power ratio (SINR) estimate and UE feedback on channel conditions. Then let $\hat{R}_l$ denote the estimation of the interference-covariance matrix at RU l. The eigenvalue decomposition (EVD) of $\hat{R}_l$ is then expressed as $$\hat{R}_l = Q\Sigma Q^{-1} = Q\Sigma^{1/2}\Sigma^{1/2}Q^*$$

where Q is the $N_l \times N_l$ eigenvector matrix and $\Sigma$ is the diagonal matrix whose diagonal elements are the eigenvalues. Only the M strongest eigenvalues and the corresponding eigenvectors are used, while the rest of the elements in the matrix are removed. In this way, a dimension-reduced matrix is obtained:

$$G_l = Q_M \bar{\Sigma}_M^{1/2}$$

where $\bar{\Sigma}_M$ denotes an M×M diagonal matrix composed by the largest M eigenvalues, and $Q_M$ is composed by M eigenvectors corresponding to the M largest eigenvalues. If the dominant eigenvalues are included, the approximation is valid that $\hat{R}_l \approx G_l G_l^*$.

Except for being used for a distributed base station system with separately located RUs, where the RUs are arranged on separate Printed Circuit Boards (PCBs), the above-described embodiments may also be used in a single large RU design with multiple radio processors, where each radio processor would take the role of an RU in the embodiments above. In this case, the radio processors/RUs of the distributed base station system may be arranged on one and the same PCB. The radio processors are then implemented in a cascaded topology, i.e. as in the described FIG. 2. This can significantly reduce the number of SerDes lanes on the PCB between the radio processors and a fronthaul interface that is to be connected to the BBU, comparing to a star-topology design. The overall required fronthaul link capacity is also significantly reduced.

Figure 7:
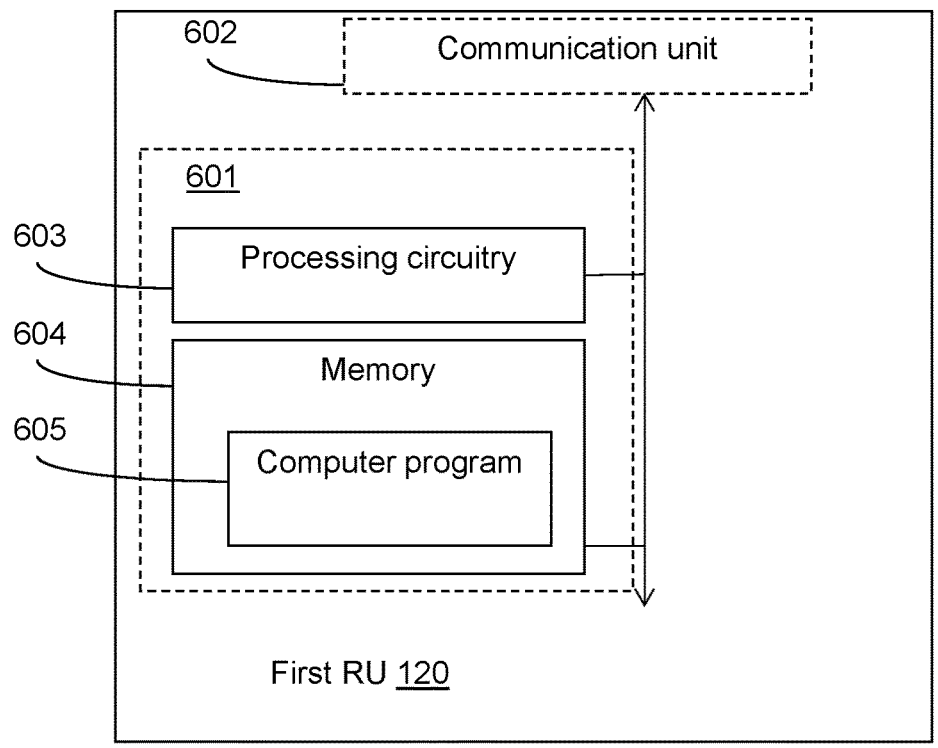
FIG. 7 is a schematic block diagram illustrating a first RU in more detail, according to further possible embodiments.

FIG. 7, in conjunction with FIG. 2, describes a first RU 120 operable in a distributed base station system 100 of a wireless communication network, the first RU 120 comprising N1 antennas 121, 122, 123. The distributed base station system 100 further comprises a BBU 110 connected to the first RU 120 over a fronthaul link 140 and a second RU 160 connected to the first RU 120 over an RU link 165. The second RU comprises N2 antennas 161, 162, 163. The first RU 120 comprises a processing circuitry 603 and a memory 604. Said memory contains instructions executable by said processing circuitry, whereby the first RU 120 is operative for obtaining first uplink signals $y_1$ in frequency domain as received at the N1 antennas 121, 122, 123 from a number of UEs 131, 132, 133, the first uplink signals $y_1$ comprising K user-layer signals in frequency domain overlaid with interference signals and noise, and obtaining a first channel estimate $\hat{H}_1$ of wireless communication channels $H_1$ in frequency domain between the number of UEs 131, 132, 133 and the N1 antennas 121, 122, 123. The first RU 120 is further operative for determining a first part of BFW for the first RU based on the first channel estimate $\hat{H}_1$ and on reference signals received at the N1 antennas together with the first uplink signals, the first part of BFW being used to reduce the N1 first uplink signals to K+M first intermediate signals $\tilde{y}_1$, where K+M is lower than N1, and determining the K+M first intermediate signals $\tilde{y}_1$ based on the N1 first uplink signals $y_1$ and on the first part of the BFW for the first RU. The first RU is further operative for determining a first part of intermediate BFW $C_1$ for interference cancellation at the BBU based on the first channel estimate $\hat{H}_1$ and on the reference signals received at the N1 antennas together with the first uplink signals. The first RU is further operative for receiving, from the second RU 160, K+M second intermediate signals $\tilde{y}_2$, the second intermediate signals being determined by the second RU based on second uplink signals $y_2$ in frequency domain as received at the N2 antennas 161, 162, 163 of the second RU from the number of UEs 131, 132, 133 and on a first part of BFW for the second RU determined by the second RU based on a second channel estimate $\hat{H}_2$ of wireless communication channels $H_2$ in frequency domain between the number UEs 131, 132, 133 and the N2 antennas 161, 162, 163 and on reference signals received at the N2 antennas together with the second uplink signals, the first part of BFW of the second RU being used to reduce the N2 second uplink signals to the K+M second intermediate signals $\tilde{y}_2$, where K+M is lower than N2. The first RU is further operative for receiving, from the second RU 160, a second part of intermediate BFW $C_2$ for interference cancellation, determined by the second RU based on the second channel estimate $\hat{H}_2$ and on the reference signals received at the N2 antennas together with the second uplink signals. The first RU is further operative for combining the first intermediate signals $\tilde{y}_1$ and the second intermediate signals $\tilde{y}_2$ into combined intermediate signals $\tilde{y}_1 + \tilde{y}_2$, combining the first part of intermediate BFW $C_1$ and the second part of intermediate BFW $C_2$ into combined intermediate BFW $C_1 + C_2$, and sending, to the BBU 110 over the fronthaul link 140, the combined intermediate signals $\tilde{y}_1 + \tilde{y}_2$ and the combined intermediate BFW $C_1 + C_2$.

According to an embodiment, the first RU 120 is further operative for determining a first error estimate $G_1$ based on the obtained first channel estimate $\hat{H}_1$ and on the reference signals $y_{ref,m,1}$ received at the N1 antennas from the number of UEs 131, 132, 133 together with the first uplink signals, the received reference signals having $\tilde{M}$ symbols for m=1, ..., $\tilde{M}$, where $\tilde{M} \geq M$, and wherein the first RU is operative for determining the first part of the BFW as well as the first part of the intermediate BFW based also on the first error estimate $G_1$.

According to another embodiment, the first RU 120 is operative for determining the first error estimate $G_1$ as $$G_1 = \frac{1}{\sqrt{M}} [\hat{g}_{1,1} \cdots \hat{g}_{\tilde{M},1}],$$

where $\hat{g}_{m,1} = y_{ref,m,1} - \hat{H} x_{ref,m}$ for m=1, ..., $\tilde{M}$, wherein $x_{ref,m}$ is the reference signals as sent from the number of UEs.

According to another embodiment, the first RU 120 is operative for determining the first intermediate signals $\tilde{y}_1$ by multiplying the first uplink signals $y_1$ with the transpose and conjugate $A_1^*$ of a first extended channel estimate $A_1$, which is obtained based on the first channel estimate $\hat{H}_1$ and the first error estimate $G_1$.

According to another embodiment, the first RU 120 is operative for determining the first part of the intermediate BFW $C_1$ by multiplying a transpose and conjugate $A_1^*$ of a first extended channel estimate $A_1$, which is obtained based on the first channel estimate $\hat{H}_1$ and the first error estimate $G_1$, with the first extended channel estimate $A_1$. According to other embodiments, the first RU 120 may further comprise a communication unit 602, which may be considered to comprise conventional means for wireless communication with the wireless devices 131, 132, 133, such as a transceiver for wireless transmission and reception of signals in the communication network. The communication unit 602 may also comprise conventional means for communication with the BBU 110. The instructions executable by said processing circuitry 603 may be arranged as a computer program 605 stored e.g. in said memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program 605 may be arranged such that when its instructions are run in the processing circuitry, they cause the first RU 120 to perform the steps described in any of the described embodiments of the first RU 120 and its method. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). In some embodiments, a carrier may contain the computer program 605. The carrier may be one of an electronic signal, an optical signal, an electromagnetic signal, a magnetic signal, an electric signal, a radio signal, a microwave signal, or computer readable storage medium. The computer-readable storage medium may be e.g. a CD, DVD or flash memory, from which the program could be downloaded into the memory 604. Alternatively, the computer program may be stored on a server or any other entity to which the first RU 120 has access via the communication unit 602. The computer program 605 may then be downloaded from the server into the memory 604.

Figure 8:
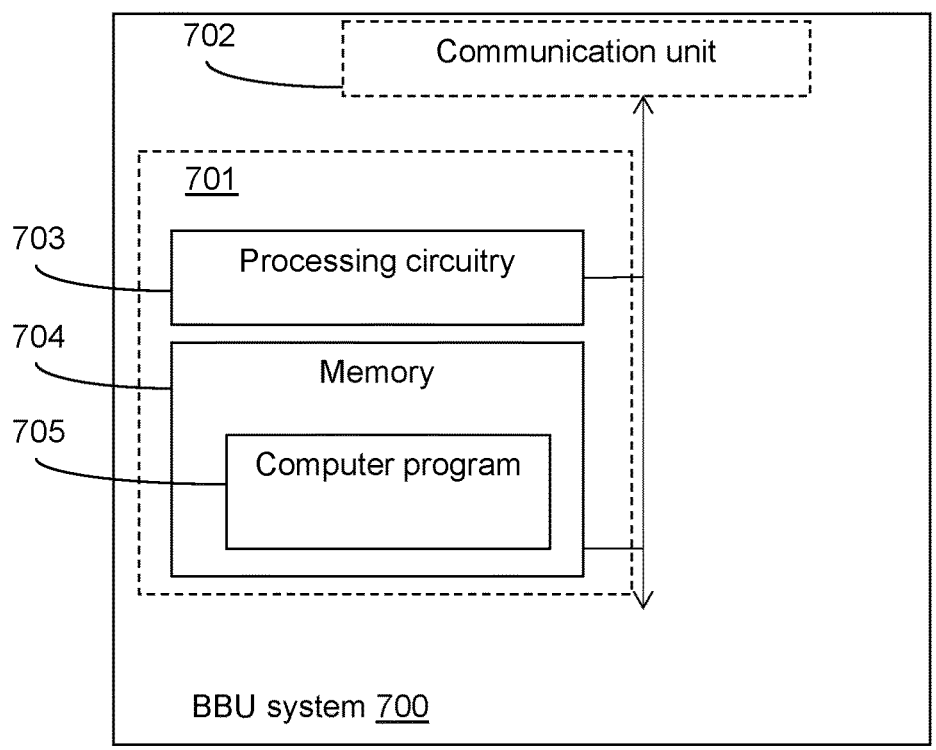
FIG. 8 is a schematic block diagram illustrating a BBU system in more detail, according to further possible embodiments.

FIG. 8, in conjunction with FIG. 2, describes a BBU system 700 operable in a wireless communication network. The wireless communication network comprises a distributed base station system 100 having a BBU 110, a first RU 120 connected to the BBU 110 over a fronthaul link 140, the first RU comprising N1 antennas 121, 122, 123, and a second RU 160 connected to the first RU 120 over an RU link 165, the second RU comprising N2 antennas 161, 162, 163. The BBU system 700 comprises a processing circuitry 703 and a memory 704. Said memory contains instructions executable by said processing circuitry, whereby the BBU system 700 is operative for receiving, from the first RU 120, combined intermediate signals $\tilde{y}_1+\tilde{y}_2$ in frequency domain comprising first intermediate signals $\tilde{y}_1$ and second intermediate signals $\tilde{y}_2$. The first intermediate signals $\tilde{y}_1$ are determined by the first RU 120 based on first uplink signals $y_1$ as received at the N1 antennas 121, 122, 123 of the first RU from a number of UEs 131, 132, 133, the first uplink signals $y_1$ comprising K user-layer signals overlaid with interference signals and noise, and on first part of BFW for the first RU, determined by the first RU based on a first channel estimate $\hat{H}_1$ of wireless communication channels $H_1$ in frequency domain between the number UEs 131, 132, 133 and the N1 antennas 121, 122, 123, and on reference signals received at the N1 antennas together with the first uplink signals, the first part of BFW being used to reduce the N1 first uplink signals to K+M first intermediate signals $\tilde{y}_1$, where K+M is lower than N1. The second intermediate signals $\tilde{y}_2$ are determined by the second RU 160 based on second uplink signals $y_2$ as received at the N2 antennas 161, 162, 163 of the second RU from the number of UEs 131, 132, 133, the second uplink signals $y_2$ comprising K user-layer signals overlaid with interference signals and noise, and on first part of BFW for the second RU, determined by the second RU based on a second channel estimate $\hat{H}_2$ of wireless communication channels $H_2$ in frequency domain between the number of UEs 131, 132, 133 and the N2 antennas 161, 162, 163, and on reference signals received at the N2 antennas together with the second uplink signals. The BBU system 700 is further operative for receiving from the first RU 120, combined intermediate BFW $C_1+C_2$ comprising a first part of intermediate BFW $C_1$ and a second part of intermediate BFW $C_2$, the first part of intermediate BFW $C_1$ being determined by the first RU 120 based on the first channel estimate $\hat{H}_1$ and on the reference signals received at the N1 antennas together with the first uplink signals, the second part of intermediate BFW $C_2$ being determined by the second RU 160 based on the second channel estimate $\hat{H}_2$ and on the reference signals received at the N2 antennas together with the second uplink signals. The BBU system 700 is further operative for determining a second part of BFW based on the combined intermediate BFW $C_1+C_2$, and for determining an estimation r of the K user-layer signals based on the combined intermediate signals $\tilde{y}_1+\tilde{y}_2$ and the second part of BFW.

The BBU system 700 may be realized as the actual BBU 110, as a unit in the BBU or as a unit somewhere in the distributed base station system 100. Alternatively, the BBU system 700 may be arranged in or at any other network node of the communication network, such as a node further away from the UEs, e.g. another network element in the RAN or close to the RAN or another RAN node. In this alternative, and in the cloud-solution embodiment discussed below, the BBU 110 is arranged to receive, from the first RU 120, the combined intermediate signals $\tilde{y}_1+\tilde{y}_2$ and the combined intermediate BFW $C_1+C_2$, and to communicate the combined intermediate signals $\tilde{y}_1+\tilde{y}_2$ and the combined intermediate BFW $C_1+C_2$ to the other network node and the BBU system of the other network node is arranged to determine 306, 308 the second part of the BFW as well as the estimation r of the K user-layer signals. Alternatively, the BBU system 700 may be realized as a group of network nodes, wherein functionality for performing of the BBU system 700 is spread out over the group of network nodes. The group of network nodes may be different physical, or virtual, nodes of the network. This alternative BBU system realization may be called a cloud-solution.

According to an embodiment, the BBU system 700 is operative for determining the second part of the BFW by determining the second part of BFW based on the inverse of the combined intermediate BFW $C_1+C_2$.

According to an embodiment, the BBU system 700 is operative for determining the second part of the BFW as the first K rows of the inverse of the combined intermediate BFW $C_1+C_2$.

According to another embodiment, the BBU system 700 is operative for determining the estimation r of the K user-layer signals by multiplying the combined intermediate signals $\tilde{y}_1+\tilde{y}_2$ with the second part of the BFW.

According to other embodiments, the first BBU system 700 may further comprise a communication unit 702, which may be considered to comprise conventional means for communication with other nodes of the communication network. In case the BBU system is realized as the actual BBU 110, the communication unit 702 may comprise conventional means for communicating with the first RU 120. In case the BBU system is realized as another unit or node than the BBU 110, the communication unit 702 may comprise conventional means for communicating with the BBU 110. The instructions executable by said processing circuitry 703 may be arranged as a computer program 705 stored e.g. in said memory 704. The processing circuitry 703 and the memory 704 may be arranged in a sub-arrangement 701. The sub-arrangement 701 may be a micro-processor and adequate software and storage therefore, a Programmable Logic Device, PLD, or other electronic component(s)/processing circuit(s) configured to perform the methods mentioned above. The processing circuitry 703 may comprise one or more programmable processor, application-specific integrated circuits, field programmable gate arrays or combinations of these adapted to execute instructions.

The computer program 705 may be arranged such that when its instructions are run in the processing circuitry, they cause the BBU system 700 to perform the steps described in any of the described embodiments of the BBU system 700 and its method. The computer program 705 may be carried by a computer program product connectable to the processing circuitry 703. The computer program product may be the memory 704, or at least arranged in the memory. The memory 704 may be realized as for example a RAM (Random-access memory), ROM (Read-Only Memory) or an EEPROM (Electrical Erasable Programmable ROM). In some embodiments, a carrier may contain the computer program 705. The carrier may be one of an electronic signal, an optical signal, an electromagnetic signal, a magnetic signal, an electric signal, a radio signal, a microwave signal, or computer readable storage medium. The computer-readable storage medium may be e.g. a CD, DVD or flash memory, from which the program could be downloaded into the memory 704. Alternatively, the computer program may be stored on a server or any other entity to which the BBU system 700 has access via the communication unit 702. The computer program 705 may then be downloaded from the server into the memory 704.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method performed by a first radio unit, RU, of a distributed base station system, the first RU comprising N1 antennas, the distributed base station system further comprising a Baseband Unit, BBU, connected to the first RU over a fronthaul link and a second RU connected to the first RU over an RU link, the second RU comprising N2 antennas, the method comprising:

obtaining first uplink signals y in frequency domain as received at the N1 antennas from a number of UEs, the first uplink signals $y_1$ comprising K user-layer signals in frequency domain overlaid with interference signals and noise;

obtaining a first channel estimate $\hat{H}_1$ of wireless communication channels $H_1$ in frequency domain between the number of UEs and the N1 antennas;

determining a first part of beamforming weights, BFW, for the first RU based on the first channel estimate $\hat{H}_1$ and on reference signals received at the N1 antennas together with the first uplink signals, the first part of BFW being used to reduce the N1 first uplink signals to K+M first intermediate signals $\tilde{y}_1$, where K+M is lower than N1;

determining the K+M first intermediate signals $\tilde{y}_1$ based on the N1 first uplink signals $y_1$ and on the first part of the BFW for the first RU;

determining a first part of intermediate BFW $C_1$ for interference cancellation at the BBU based on the first channel estimate $\hat{H}_1$ and on the reference signals received at the N1 antennas together with the first uplink signals, receiving, from the second RU, K+M second intermediate signals $\tilde{y}_2$, the second intermediate signals being determined by the second RU based on second uplink signals $y_2$ in frequency domain as received at the N2 antennas of the second RU from the number of UEs and on a first part of BFW for the second RU determined by the second RU based on a second channel estimate $\hat{H}_2$ of wireless communication channels $H_2$ in frequency domain between the number UEs and the N2 antennas and on reference signals received at the N2 antennas together with the second uplink signals, the first part of BFW of the second RU being used to reduce the N2 second uplink signals to the K+M second intermediate signals $\tilde{y}_2$, where K+M is lower than N2;

receiving, from the second RU, a second part of intermediate BFW $C_2$ for interference cancellation, determined by the second RU based on the second channel estimate $\hat{H}_2$ and on the reference signals received at the N2 antennas together with the second uplink signals;

combining the first intermediate signals $\tilde{y}_1$ and the second intermediate signals $\tilde{y}_2$ into combined intermediate signals $\tilde{y}_1+\tilde{y}_2$;

combining the first part of intermediate BFW $C_1$ and the second part of intermediate BFW $C_2$ into combined intermediate BFW $C_1+C_2$, and sending, to the BBU over the fronthaul link, the combined intermediate signals $\tilde{y}_1+\tilde{y}_2$ and the combined intermediate BFW $C_1+C_2$.

2. The method according to claim 1 further comprising: determining a first error estimate $G_1$ based on the obtained first channel estimate $\hat{H}_1$ and on the reference signals $y_{ref,m,1}$ received at the N1 antennas from the number of UEs together with the first uplink signals, the received reference signals having $\tilde{M}$ symbols for m=1, ..., $\tilde{M}$, where $\tilde{M} \geq M$, and wherein the first part of the BFW as well as the first part of the intermediate BFW are determined based also on the first error estimate $G_1$.

3. The method according to claim 2, wherein the first error estimate $G_1$ is determined as $$G_1 = \frac{1}{\sqrt{M}}[\hat{g}_{1,1} \cdots \hat{g}_{M,1}],$$

where $\hat{g}_{m,1} = y_{ref,m,1} - \hat{H}x_{ref,m}$ for m=1, ..., $\tilde{M}$, wherein $x_{ref,m}$ is the reference signals as sent from the number of UEs.

4. The method according to claim 2, wherein the determining of the first intermediate signals $\tilde{y}_1$ comprises multiplying the first uplink signals $y_1$ with the transpose and conjugate $A_1^*$ of a first extended channel estimate $A_1$, which is obtained based on the first channel estimate $\hat{H}_1$ and the first error estimate $G_1$.

5. The method according to claim 2, wherein the first part of the intermediate BFW $C_1$ are determined by multiplying a transpose and conjugate $A_1^*$ of a first extended channel estimate $A_1$, which is obtained based on the first channel estimate $\hat{H}_1$ and the first error estimate $G_1$, with the first extended channel estimate $A_1$.

6. A method performed by a Baseband Unit, BBU, system of a wireless communication network, the wireless communication network comprising a distributed base station system having a BBU, a first Radio Unit, RU, connected to the BBU over a fronthaul link, the first RU comprising N1 antennas, and a second RU connected to the first RU over an RU link, the second RU comprising N2 antennas, the method comprising:

receiving, from the first RU, combined intermediate signals $\tilde{y}_1+\tilde{y}_2$ in frequency domain comprising first intermediate signals $\tilde{y}_1$ and second intermediate signals $\tilde{y}_2$, the first intermediate signals $\tilde{y}_1$ being determined by the first RU based on first uplink signals $y_1$ as received at the N1 antennas of the first RU from a number of UEs, the first uplink signals $y_1$ comprising K user-layer signals overlaid with interference signals and noise, and on first part of BFW for the first RU, determined by the first RU based on a first channel estimate $\hat{H}_1$ of wireless communication channels $H_1$ in frequency domain between the number UEs and the N1 antennas, and on reference signals received at the N1 antennas together with the first uplink signals, the first part of BFW being used to reduce the N1 first uplink signals to K+M first intermediate signals $\tilde{y}_1$, where K+M is lower than N1, the second intermediate signals $\tilde{y}_2$ being determined by the second RU based on second uplink signals $y_2$ as received at the N2 antennas of the second RU from the number of UEs, the second uplink signals $y_2$ comprising K user-layer signals overlaid with interference signals and noise, and on first part of BFW for the second RU, determined by the second RU based on a second channel estimate $\hat{H}_2$ of wireless communication channels $H_2$ in frequency domain between the number of UEs and the N2 antennas, and on reference signals received at the N2 antennas together with the second uplink signals;

receiving from the first RU, combined intermediate BFW $C_1+C_2$ comprising a first part of intermediate BFW $C_1$ and a second part of intermediate BFW $C_2$, the first part of intermediate BFW $C_1$ being determined by the first RU based on the first channel estimate $\hat{H}_1$ and on the reference signals received at the N1 antennas together with the first uplink signals, the second part of intermediate BFW $C_2$ being determined by the second RU based on the second channel estimate $\hat{H}_2$ and on the reference signals received at the N2 antennas together with the second uplink signals;

determining a second part of BFW based on the combined intermediate BFW $C_1+C_2$, and determining an estimation r of the K user-layer signals based on the combined intermediate signals $\tilde{y}_1+\tilde{y}_2$ and the second part of BFW.

7. The method according to claim 6, wherein the determining of the second part of the BFW comprises determining the second part of BFW based on the inverse of the combined intermediate BFW $C_1+C_2$.

8. The method according to claim 7, wherein the second part of the BFW is determined as the first K rows of the inverse of the combined intermediate BFW $C_1+C_2$.

9. The method according to claim 6, wherein the estimation r of the K user-layer signals is determined by multiplying the combined intermediate signals $\tilde{y}_1+\tilde{y}_2$ with the second part of the BFW.

10. A first Radio Unit, RU, operable in a distributed base station system of a wireless communication network, the first RU comprising N1 antennas, the distributed base station system further comprising a Baseband Unit, BBU, connected to the first RU over a fronthaul link and a second RU connected to the first RU over an RU link, the second RU comprising N2 antennas, the first RU comprising a processing circuitry and a memory, said memory containing instructions executable by said processing circuitry, whereby the first RU is operative for:

obtaining first uplink signals $y_1$ in frequency domain as received at the N1 antennas from a number of UEs, the first uplink signals $y_1$ comprising K user-layer signals in frequency domain overlaid with interference signals and noise;

obtaining a first channel estimate $\hat{H}_1$ of wireless communication channels $H_1$ in frequency domain between the number of UEs and the N1 antennas;

determining a first part of beamforming weights, BFW, for the first RU based on the first channel estimate $\hat{H}_1$ and on reference signals received at the N1 antennas together with the first uplink signals, the first part of BFW being used to reduce the N1 first uplink signals to K+M first intermediate signals $\tilde{y}_1$, where K+M is lower than N1;

determining the K+M first intermediate signals $\tilde{y}_1$ based on the N1 first uplink signals $y_1$ and on the first part of the BFW for the first RU;

determining a first part of intermediate BFW $C_1$ for interference cancellation at the BBU based on the first channel estimate $\hat{H}_1$ and on the reference signals received at the $N_1$ antennas together with the first uplink signals, receiving, from the second RU, K+M second intermediate signals $\tilde{y}_2$, the second intermediate signals being determined by the second RU based on second uplink signals $y_2$ in frequency domain as received at the N2 antennas of the second RU from the number of UEs and on a first part of BFW for the second RU determined by the second RU based on a second channel estimate $\hat{H}_1$ of wireless communication channels $H_2$ in frequency domain between the number UEs and the N2 antennas and on reference signals received at the N2 antennas together with the second uplink signals, the first part of BFW of the second RU being used to reduce the N2 second uplink signals to the K+M second intermediate signals $\tilde{y}_2$, where K+M is lower than N2;

receiving, from the second RU, a second part of intermediate BFW $C_2$ for interference cancellation, determined by the second RU based on the second channel estimate $\hat{H}_2$ and on the reference signals received at the N2 antennas together with the second uplink signals;

combining the first intermediate signals $\tilde{y}_1$ and the second intermediate signals 2 into combined intermediate signals $\tilde{y}_1+\tilde{y}_2$;

combining the first part of intermediate BFW $C_1$ and the second part of intermediate BFW $C_2$ into combined intermediate BFW $C_1+C_2$, and sending, to the BBU over the fronthaul link, the combined intermediate signals $\tilde{y}_1+\tilde{y}_2$ and the combined intermediate BFW $C_1+C_2$.

11. The first RU according to claim 10, further being operative for:

determining a first error estimate $G_1$ based on the obtained first channel estimate $\hat{H}_1$ and on the reference signals $y_{ref,m,1}$ received at the N1 antennas from the number of UEs together with the first uplink signals, the received reference signals having $\tilde{M}$ symbols for m=1, . . . , $\tilde{M}$, where $\tilde{M} \geq M$, and wherein the first RU is operative for determining the first part of the BFW as well as the first part of the intermediate BFW based also on the first error estimate $G_1$.

12. The first RU according to claim 11, operative for determining the first error estimate $G_1$ as $$G_1 = \frac{1}{\sqrt{\tilde{M}}}[\hat{g}_{1,1} \cdots \hat{g}_{\tilde{M},1}],$$

where $\hat{g}_{m,1} = y_{ref,m,1} - \hat{H} x_{ref,m}$ for m=1, . . . , $\tilde{M}$, wherein $x_{ref,m}$ is the reference signals as sent from the number of UEs.

13. The first RU according to claim 11, operative for determining the first intermediate signals $\tilde{y}_1$ by multiplying the first uplink signals $y_1$ with the transpose and conjugate $A_1^*$ of a first extended channel estimate $A_1$, which is obtained based on the first channel estimate $\hat{H}_1$ and the first error estimate $G_1$.

14. The first RU according to claim 11, operative for determining the first part of the intermediate BFW $C_1$ by multiplying a transpose and conjugate $A_1^*$ of a first extended channel estimate $A_1$, which is obtained based on the first channel estimate $\hat{H}_1$ and the first error estimate $G_1$, with the first extended channel estimate $A_1$.

15. A Baseband Unit, BBU, system operable in a wireless communication network, the wireless communication network comprising a distributed base station system having a BBU, a first Radio Unit, RU, connected to the BBU over a fronthaul link, the first RU comprising N1 antennas, and a second RU connected to the first RU over an RU link, the second RU comprising N2 antennas, the BBU system comprising a processing circuitry and a memory, said memory containing instructions executable by said processing circuitry, whereby the BBU system is operative for:

receiving, from the first RU, combined intermediate signals $\tilde{y}_1+\tilde{y}_2$ in frequency domain comprising first intermediate signals $\tilde{y}_1$ and second intermediate signals $\tilde{y}_2$, the first intermediate signals $\tilde{y}_1$ being determined by the first RU based on first uplink signals $y_1$ as received at the N1 antennas of the first RU from a number of UEs, the first uplink signals $y_1$ comprising K user-layer signals overlaid with interference signals and noise, and on first part of BFW for the first RU, determined by the first RU based on a first channel estimate $\hat{H}_1$ of wireless communication channels $H_1$ in frequency domain between the number UEs and the N1 antennas, and on reference signals received at the N1 antennas together with the first uplink signals, the first part of BFW being used to reduce the N1 first uplink signals to K+M first intermediate signals $\tilde{y}_1$, where K+M is lower than N1, the second intermediate signals $\tilde{y}_2$ being determined by the second RU based on second uplink signals $y_2$ as received at the N2 antennas of the second RU from the number of UEs, the second uplink signals $y_2$ comprising K user-layer signals overlaid with interference signals and noise, and on first part of BFW for the second RU, determined by the second RU based on a second channel estimate $\hat{H}_2$ of wireless communication channels $H_2$ in frequency domain between the number of UEs and the N2 antennas, and on reference signals received at the N2 antennas together with the second uplink signals;

receiving from the first RU, combined intermediate BFW $C_1+C_2$ comprising a first part of intermediate BFW $C_1$ and a second part of intermediate BFW $C_2$, the first part of intermediate BFW $C_1$ being determined by the first RU based on the first channel estimate $\hat{H}_1$ and on the reference signals received at the N1 antennas together with the first uplink signals, the second part of intermediate BFW $C_2$ being determined by the second RU based on the second channel estimate $\hat{H}_2$ and on the reference signals received at the N2 antennas together with the second uplink signals;

determining a second part of BFW based on the combined intermediate BFW $C_1+C_2$, and determining an estimation r of the K user-layer signals based on the combined intermediate signals $\tilde{y}_1+\tilde{y}_2$ and the second part of BFW.

16. The BBU system according to claim 15, operative for determining the second part of the BFW by determining the second part of BFW based on the inverse of the combined intermediate BFW $C_1+C_2$.

17. The BBU system according to claim 16, operative for determining the second part of the BFW as the first K rows of the inverse of the combined intermediate BFW $C_1+C_2$.

18. The BBU system according to claim 15, operative for determining the estimation r of the K user-layer signals by multiplying the combined intermediate signals $\tilde{y}_1 + \tilde{y}_2$ with the second part of the BFW.

19. A non-transitory computer readable medium comprising instructions, which, when executed by at least one processing circuitry of a first Radio Unit, RU, operable in a distributed base station system, the distributed base station system further comprising a Baseband Unit, BBU, connected to the first RU over a fronthaul link and a second RU connected to the first RU over an RU link, the first RU comprising N1 antennas and the second RU comprising N2 antennas, causes the first RU to perform the following steps:

obtaining first uplink signals $y_1$ in frequency domain as received at the N1 antennas from a number of UEs, the first uplink signals y comprising K user-layer signals in frequency domain overlaid with interference signals and noise;

obtaining a first channel estimate $\hat{H}_1$ of wireless communication channels $H_1$ in frequency domain between the number of UEs and the N1 antennas;

determining a first part of beamforming weights, BFW, for the first RU based on the first channel estimate $\hat{H}_1$ and on reference signals received at the N1 antennas together with the first uplink signals, the first part of BFW being used to reduce the N1 first uplink signals to K+M first intermediate signals $\tilde{y}_1$, where K+M is lower than N1;

determining the K+M first intermediate signals $\tilde{y}_1$ based on the N1 first uplink signals $y_1$ and on the first part of the BFW for the first RU;

determining a first part of intermediate BFW $C_1$ for interference cancellation at the BBU based on the first channel estimate $\hat{H}_1$ and on the reference signals received at the N1 antennas together with the first uplink signals, receiving, from the second RU, K+M second intermediate signals $\tilde{y}_2$, the second intermediate signals being determined by the second RU based on second uplink signals $y_2$ in frequency domain as received at the N2 antennas of the second RU from the number of UEs and on a first part of BFW for the second RU determined by the second RU based on a second channel estimate $\hat{H}_2$ of wireless communication channels $H_2$ in frequency domain between the number UEs and the N2 antennas and on reference signals received at the N2 antennas together with the second uplink signals, the first part of BFW of the second RU being used to reduce the N2 second uplink signals to the K+M second intermediate signals $\tilde{y}_2$, where K+M is lower than N2;

receiving, from the second RU, a second part of intermediate BFW $C_2$ for interference cancellation, determined by the second RU based on the second channel estimate $\hat{H}_2$ and on the reference signals received at the N2 antennas together with the second uplink signals;

combining the first intermediate signals $\tilde{y}_1$ and the second intermediate signals $\tilde{y}_2$ into combined intermediate signals $\tilde{y}_1 + \tilde{y}_2$;

combining the first part of intermediate BFW $C_1$ and the second part of intermediate BFW $C_2$ into combined intermediate BFW $C_1 + C_2$, and sending, to the BBU over the fronthaul link, the combined intermediate signals $\tilde{y}_1 + \tilde{y}_2$ and the combined intermediate BFW $C_1 + C_2$.

20. A non-transitory computer readable medium comprising instructions, which, when executed by at least one processing circuitry of a Baseband Unit, BBU, system of a wireless communication network, the wireless communication network comprising a distributed base station system having a BBU, a first Radio Unit, RU, connected to the BBU over a fronthaul link, the first RU comprising N1 antennas, and a second RU connected to the first RU over an RU link, the second RU comprising N2 antennas, causes the BBU system to perform the following steps:

receiving, from the first RU, combined intermediate signals $\tilde{y}_1 + \tilde{y}_2$ in frequency domain comprising first intermediate signals $\tilde{y}_1$ and second intermediate signals $\tilde{y}_2$, the first intermediate signals $\tilde{y}_1$ being determined by the first RU based on first uplink signals $y_1$ as received at the N1 antennas of the first RU from a number of UEs, the first uplink signals $y_1$ comprising K user-layer signals overlaid with interference signals and noise, and on first part of BFW for the first RU, determined by the first RU based on a first channel estimate $\hat{H}_1$ of wireless communication channels $H_1$ in frequency domain between the number UEs and the N1 antennas, and on reference signals received at the N1 antennas together with the first uplink signals, the first part of BFW being used to reduce the N1 first uplink signals to K+M first intermediate signals $\tilde{y}_1$, where K+M is lower than N1, the second intermediate signals $\tilde{y}_2$ being determined by the second RU based on second uplink signals $y_2$ as received at the N2 antennas of the second RU from the number of UEs, the second uplink signals $y_2$ comprising K user-layer signals overlaid with interference signals and noise, and on first part of BFW for the second RU, determined by the second RU based on a second channel estimate $\hat{H}_2$ of wireless communication channels $H_2$ in frequency domain between the number of UEs and the N2 antennas, and on reference signals received at the N2 antennas together with the second uplink signals;

receiving from the first RU, combined intermediate BFW $C_1 + C_2$ comprising a first part of intermediate BFW $C_1$ and a second part of intermediate BFW $C_2$, the first part of intermediate BFW $C_1$ being determined by the first RU based on the first channel estimate $\hat{H}_1$ and on the reference signals received at the N1 antennas together with the first uplink signals, the second part of intermediate BFW $C_2$ being determined by the second RU based on the second channel estimate $\hat{H}_2$ and on the reference signals received at the N2 antennas together with the second uplink signals;

determining a second part of BFW based on the combined intermediate BFW $C_1 + C_2$, and determining an estimation r of the K user-layer signals based on the combined intermediate signals $\tilde{y}_1 + \tilde{y}_2$ and the second part of BFW.

\* \* \* \* \*

UNITED STATES PATENT AND TRADEMARK OFFICE
CERTIFICATE OF CORRECTION

PATENT NO. : 12,244,378 B2
APPLICATION NO. : 18/277638
DATED : March 4, 2025
INVENTOR(S) : Huang et al.

It is certified that error appears in the above-identified patent and that said Letters Patent is hereby corrected as shown below:

On the Title Page

On Page 2, in Item (56), under "OTHER PUBLICATIONS", in Column 2, Line 7, delete "Iu," and insert -- Liu, --, therefor.

On Page 2, in Item (56), under "OTHER PUBLICATIONS", in Column 2, Line 11, delete "EEE" and insert -- IEEE --, therefor.

In the Drawings

In Fig. 3, Sheet 3 of 7, for Tag "212", Line 1, delete "1st" and insert -- $1^{st}$ --, therefor.

In the Specification

In Column 1, Line 31, delete "base band" and insert -- baseband --, therefor.

In Column 1, Line 33, delete "base band" and insert -- baseband --, therefor.

In Column 2, Line 49, delete "Odling," and insert -- Ödling, --, therefor.

In Column 4, Line 38, delete "BFW)for" and insert -- BFW for --, therefor.

In Column 9, Line 6, delete "equipped" and insert -- equipment --, therefor.

In Column 17, Line 27, delete "lease" and insert -- least --, therefor.

In Column 19, Line 53, delete "(Electrical" and insert -- (Electrically --, therefor.

In Column 21, Line 53, delete "(Electrical" and insert -- (Electrically --, therefor.

Signed and Sealed this
Sixteenth Day of September, 2025

Coke Morgan Stewart
*Acting Director of the United States Patent and Trademark Office*

CERTIFICATE OF CORRECTION (continued)
U.S. Pat. No. 12,244,378 B2

In the Claims

In Column 22, Line 28, in Claim 1, delete "yin" and insert -- $y_1$ in --, therefor.

In Column 23, Line 3, in Claim 1, delete "$\tilde{y}_1$and" and insert -- $\tilde{y}_1$ and --, therefor.

In Column 23, Line 18, in Claim 2, delete "$\tilde{M}$symbols" and insert -- $\tilde{M}$ symbols --, therefor.

In Column 23, Line 34, in Claim 4, delete "$\tilde{y}_1$comprises" and insert -- $\tilde{y}_1$ comprises --, therefor.

In Column 23, Line 57, in Claim 6, delete "$\tilde{y}_1$being" and insert -- $\tilde{y}_1$ being --, therefor.

In Column 24, Line 30, in Claim 6, delete "$\tilde{y}_1+\tilde{y}_2$and" and insert -- $\tilde{y}_1+\tilde{y}_2$ and --, therefor.

In Column 25, Line 30, in Claim 10, delete "2" and insert -- $\tilde{y}_2$ --, therefor.

In Column 25, Line 44, in Claim 11, delete "$\tilde{M}$symbols" and insert -- $\tilde{M}$ symbols --, therefor.

In Column 27, Line 16, in Claim 19, delete "y" and insert -- $y_1$ --, therefor.

In Column 27, Line 29, in Claim 19, delete "$\tilde{y}_1$based" and insert -- $\tilde{y}_1$ based --, therefor.